United States Patent
Null et al.

(10) Patent No.: US 11,823,238 B1
(45) Date of Patent: Nov. 21, 2023

(54) VIRALITY CAUSE DETERMINATION

(71) Applicant: Reputation.com, Inc., Redwood City, CA (US)

(72) Inventors: Bradley William Null, Millbrae, CA (US); Pranav Desai, Millbrae, CA (US); Hsin-wei Tsao, Menlo Park, CA (US)

(73) Assignee: Reputation.com, Inc., San Ramon, CA (US)

( * ) Notice: Subject to any disclaimer, the term of this patent is extended or adjusted under 35 U.S.C. 154(b) by 213 days.

(21) Appl. No.: 16/817,221

(22) Filed: Mar. 12, 2020

Related U.S. Application Data

(63) Continuation of application No. 62/952,683, filed on Dec. 23, 2019.

(51) Int. Cl.
*G06Q 30/0282* (2023.01)
*G06Q 30/0203* (2023.01)
*G06F 16/901* (2019.01)
*G06Q 50/00* (2012.01)
*G06N 5/02* (2023.01)

(52) U.S. Cl.
CPC ....... *G06Q 30/0282* (2013.01); *G06F 16/901* (2019.01); *G06N 5/02* (2013.01); *G06Q 30/0203* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,165,853 | B2 * | 4/2012 | Pinto | G06Q 40/03 703/2 |
| 2008/0215571 | A1 * | 9/2008 | Huang | G06F 16/345 707/999.005 |
| 2009/0265198 | A1 | 10/2009 | Lester | |
| 2011/0055104 | A1 * | 3/2011 | Sun | G06Q 10/10 705/347 |
| 2012/0124192 | A1 * | 5/2012 | Daoud | G06F 16/248 709/224 |

(Continued)

OTHER PUBLICATIONS

Ee-Peng Lim, Viet-An Nguyen, Nitin Jindal, Bing Liu, and Hady Wirawan Lauw. 2010. Detecting product review spammers using rating behaviors. In Proceedings of the 19th ACM international conference on Information and knowledge management. Association for Computing Machinery, New York, NY, USA, (Year: 2010).*

(Continued)

*Primary Examiner* — Andrew B Whitaker
(74) *Attorney, Agent, or Firm* — Van Pelt, Yi & James LLP

(57) ABSTRACT

Virality cause determination includes receiving a plurality of historical feedback items. It further includes bucketing a first feedback item in the plurality of historical feedback items into a first partition of feedback items, and bucketing a second feedback item in the plurality of historical feedback items into a second partition of feedback items. The second partition of feedback items is a baseline partition of feedback items. It further includes determining a set of candidate patterns present in the first partition of feedback items. It further includes determining whether a candidate pattern in the set of candidate patterns is disproportionately associated with the first partition of feedback items relative to the baseline partition of feedback items.

9 Claims, 5 Drawing Sheets

(56) References Cited

U.S. PATENT DOCUMENTS

| | | | | |
|---|---|---|---|---|
| 2012/0197816 | A1* | 8/2012 | Short | G06Q 30/0282 |
| | | | | 705/347 |
| 2013/0282810 | A1* | 10/2013 | Lessin | G06Q 50/01 |
| | | | | 709/204 |
| 2014/0075500 | A1* | 3/2014 | B'Far | H04L 63/20 |
| | | | | 726/1 |
| 2014/0278485 | A1 | 9/2014 | Grant | |
| 2014/0324728 | A1* | 10/2014 | Agrawal | G06Q 30/0282 |
| | | | | 705/347 |
| 2014/0330760 | A1 | 11/2014 | Meier | |
| 2014/0337141 | A1 | 11/2014 | Ghosh | |
| 2015/0195295 | A1* | 7/2015 | Sandler | G06F 16/951 |
| | | | | 726/26 |
| 2015/0261759 | A1 | 9/2015 | Rodriguez | |
| 2015/0262081 | A1 | 9/2015 | Rodriguez | |
| 2015/0356488 | A1 | 12/2015 | Eden | |
| 2016/0055161 | A1 | 2/2016 | Ghosh | |
| 2016/0117695 | A1* | 4/2016 | Fuller | G06Q 30/0282 |
| | | | | 705/7.32 |
| 2016/0321575 | A1 | 11/2016 | He | |
| 2017/0293873 | A1 | 10/2017 | Chrapko | |
| 2018/0033031 | A1* | 2/2018 | Kobayashi | G06Q 30/0282 |
| 2018/0053235 | A1* | 2/2018 | Catalano | G06Q 30/0201 |
| 2019/0012747 | A1 | 1/2019 | Antonelli | |
| 2019/0026786 | A1 | 1/2019 | Khoury | |
| 2019/0294731 | A1 | 9/2019 | Gao | |
| 2021/0090178 | A1 | 3/2021 | Bungert | |
| 2021/0390458 | A1 | 12/2021 | Blumstein | |

OTHER PUBLICATIONS

Hermoso et al., From Blurry Numbers To Clear Preferences: A mechanism to extract reputation in social networks, Expert Systems with Applications, 2014, pp. 1-17, https://www.sciencedirect.com/science/article/pii/50957 417413007598?via%3Dihub.

Hendrikx et al., Reputation Systems: A Survey and Taxonomy, Journal of Parallel Distributed Computing, 2015, pp. 184-197.

Zhang et al., CommTrust: Computing Multi-Dimensional Trust by Mining E-Commerce Feedback Comments, IEEE Transactions on Knowledge and Data Engineering, Jul. 2014, pp. 1631-1643, vol. 26, No. 7.

* cited by examiner

VIRALITY CAUSE DETERMINATION

CROSS REFERENCE TO OTHER APPLICATIONS

This application claims priority to U.S. Provisional Patent Application No. 62/952,683 entitled REPUTATION SCORING AND INSIGHTS filed Dec. 23, 2019 which is incorporated herein by reference for all purposes.

BACKGROUND OF THE INVENTION

Businesses are increasingly concerned with their online reputations. For example, both positive and negative reviews and comments posted to a review or social website can have real-world impacts on those businesses. As more review websites are created, and as more users post more content to those sites, it is becoming increasingly difficult for businesses to monitor such sites. This leads to various challenges for businesses in managing their online reputation. For example, it can be difficult for businesses to determine where they need to, and how they can, improve their online reputations. As another example, given the possibility that any piece of posted content could become viral, damage to online reputations can happen suddenly, catching businesses unaware and unprepared.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for managing the online reputation of an entity such as a business and/or an individual. In various embodiments, the techniques described herein include techniques for determining insights from feedback data about entities to perform reputation management processing, such as virality cause determination (e.g., risk management), impact-based strength and weakness determination, and reputation score calibration.

Figure 1:
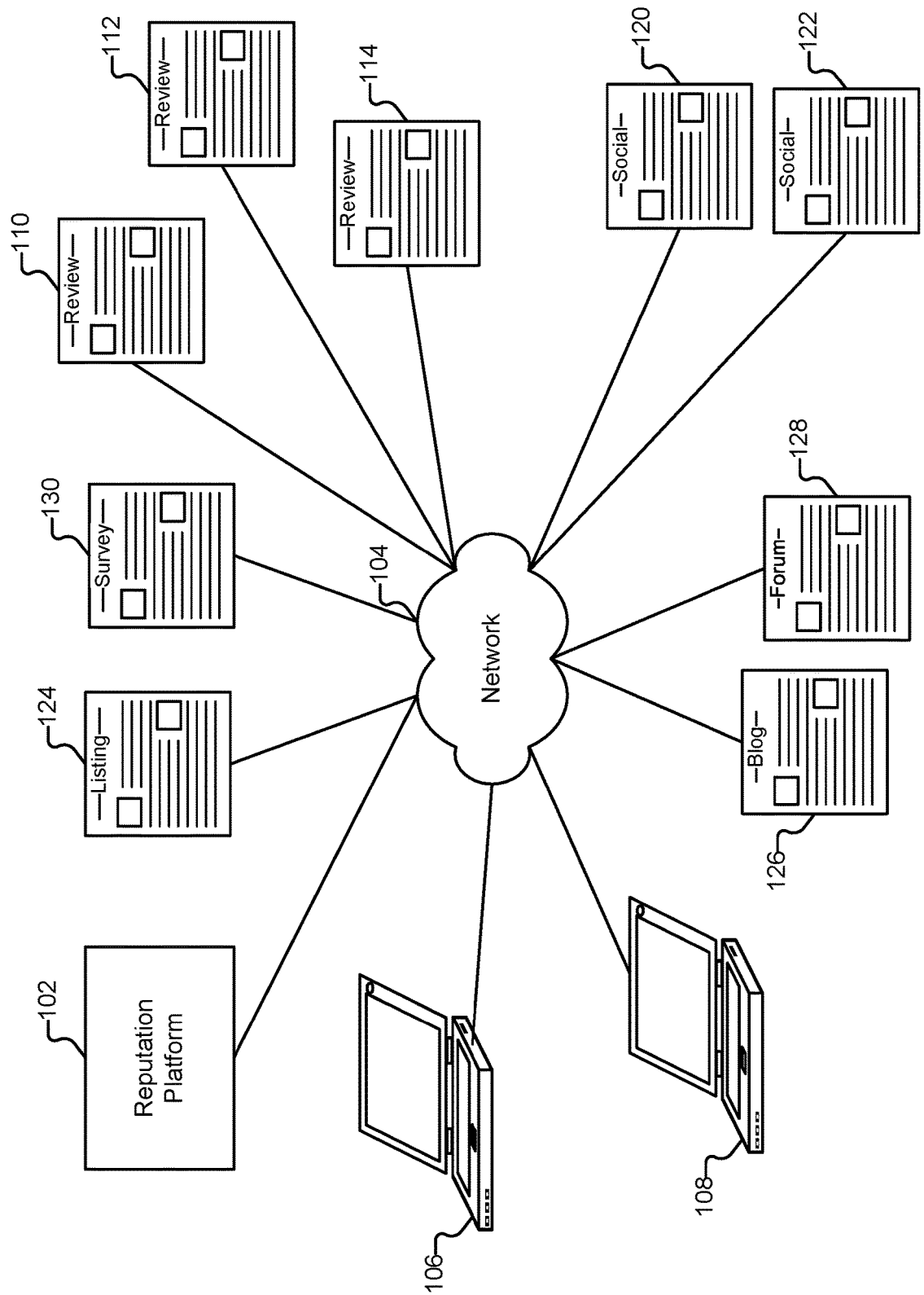
FIG. 1 illustrates an embodiment of an environment in which entity reputation information is collected, analyzed, and presented.

FIG. 1 illustrates an embodiment of an environment in which entity reputation information is collected, analyzed, and presented. In the example shown, the user of client device 106 (hereinafter referred to as "Bob") is employed by a hospital ("ACME Hospital"). The user of client device 108 (hereinafter referred to as "Alice") is employed by a national chain of dealerships ("AutoBest"). As will be described in more detail below, Bob and Alice can each access the services of reputation platform 102 (via network 104) to track and manage the reputations of their respective businesses online. The techniques described herein can work with a variety of client devices 106-108 including, but not limited to, personal computers, tablet computers, and smartphones. In this example, ACME and AutoBest are entities that are customers or subscribers of the services provided by platform 102. Such entities are also referred to herein as "tenants" or "rooftops," who may have one or more "locations."

Reputation platform 102 is configured to collect reputation and other feedback data from a variety of sources, including review websites 110-114, social networking websites 120-122, listing website 124, and other websites 126-128. In some embodiments, feedback data such as survey data is also provided to platform 102. In the examples described herein, review site 110 is a general purpose review site that allows users to post reviews regarding all types of businesses. Examples of such review sites include Google Places, Yahoo! Local, Citysearch, Yelp, Zagat, etc. Review site 112 is a healthcare oriented review site that allows users to post reviews of physicians, hospitals, etc. Examples of healthcare oriented review sites include Healthgrades and Vitals. Review site 114 is specific to auto dealerships. An example of an auto dealership oriented review site is Cars.com. Examples of social networking sites 120 and 122 include Twitter, Foursquare, Facebook, etc. Social networking sites 120-122 allow users to take actions such as "checking in" to locations, "liking" locations on profile pages of the location, giving "thumbs up" or "thumbs down," etc. Listing website 124 is a directory on which businesses can list information about themselves, such as their phone number, hours of operation, website, etc. An example of a listing website is Yellowpages.com. Some sites function as multiple types (e.g. Google My Business pages). Personal blog 126 and online forum 128 are examples of other types of websites "on the open Web" that can contain reputation information about an entity such as a business. Finally, external survey source 130 is a source external to platform 102 from which user surveys can be collected. One example of an external survey is the HCAHPS (Hospital Consumer Assessment of Healthcare Providers and Systems) survey.

Platform 102 is illustrated as a single logical device in FIG. 1. In various embodiments, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task.

Figure 2:
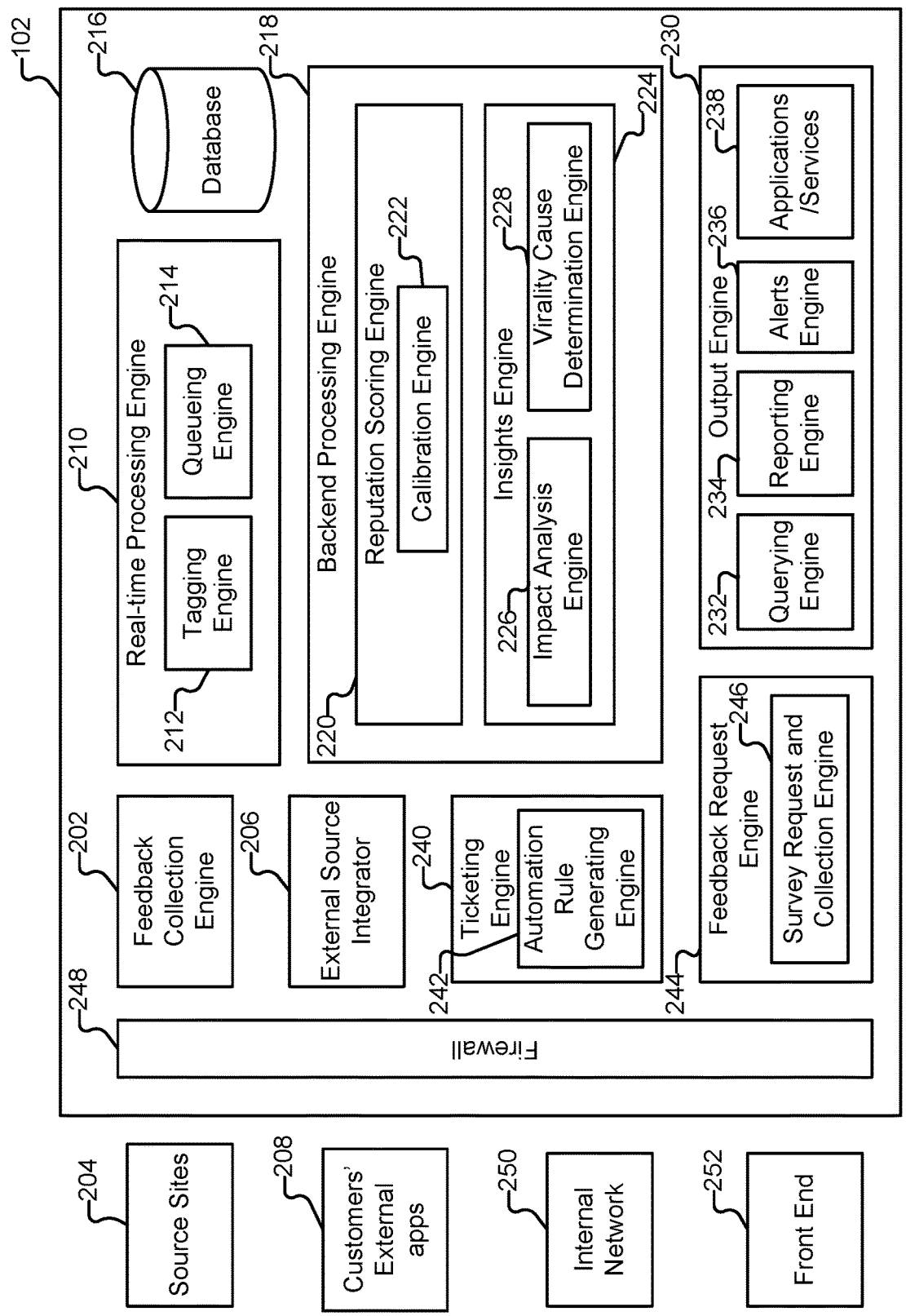
FIG. 2 illustrates an embodiment of a reputation management platform.

FIG. 2 illustrates an embodiment of a reputation platform for online reputation management. In this example, an embodiment of reputation platform 102 of FIG. 1 is described.

Feedback Data Collection and Processing

Feedback collection engine 202 is configured to collect feedback data from various source sites 204 such as review websites, listing websites, social network sites, industry-specific sites, blogs, etc., such as those described above. Examples of feedback data items collected by platform 102 include reviews, surveys, listings, social comments, search results, etc. In one example implementation, the feedback collection engine is implemented as a set of Java modules.

Feedback collection may be performed in a variety of ways, which may depend, for example, on the source site from which the feedback data is obtained. As one example, feedback data is collected via an API (Application Programming Interface). For example, source sites such as Facebook and Google provide an API via which updates (such as real-time updates—also referred to as "RTUs") are provided that indicate when a new piece of feedback (e.g., social comment, review, etc.) is available for an entity (or one of its locations) on the source site being monitored by platform 102.

As one example, suppose that platform 102 is monitoring the social network, Facebook, on behalf of the dealership franchise, AutoBest, which has multiple dealerships across multiple cities. In this example, platform 102 registers with Facebook, instructing Facebook to send an update to platform 102 whenever a review comes up, for example, for a specific dealership in a particular city. When the update from Facebook is received by platform 102, the feedback collection engine then collects the new review from Facebook via the API.

While source sites such as Facebook and Google provide functionality to provide real-time updates on new feedback, such updates are not always guaranteed to be provided, and thus, in some cases, updates may not be sent out from the source site notifying platform 102 of the new feedback update.

To counter this issue of not being provided updates when new feedback is available (and thus causing platform 102 to miss feedback), in some embodiments, the feedback collection engine is configured to poll the source site for feedback. For example, on a periodic basis (e.g., hourly, daily, etc.), the feedback collection engine is configured to query the source site (e.g., using an API) for any reviews for a location being monitored. In some embodiments, performing the polling includes using credentials for the entity to obtain the reviews. For example, platform 102 obtains AutoBest's Facebook credentials, and uses them on AutoBest's behalf to access the feedback data for the various AutoBest franchises (which may have their own respective profile pages on Facebook).

In some embodiments, the feedback collection is configured to collect feedback data by performing scraping. For example, in some cases, the approaches such as those described above for collecting feedback data may not be available. For example, a source site may not have the capability to provide real-time updates. As another example, polling may not be available for a source site because, for example, the functionality is not supported, or because there are no credentials available because the location changed their social network account password, such that the platform is no longer able to collect feedback data from the source site. As another example, some source sites do not provide interfaces such as APIs by which to query for and collect feedback data. In such cases, helpers such as web scrapers may be used to scrape feedback data from a source site. The scraping may be performed on a periodic basis (e.g., every 24 hours). The web scrapers may also be used to collect feedback data from sites where platform 102 does not have the ability to obtain credentials. For example, some source sites do not provide their API for reviews.

In some embodiments, the feedback collection engine includes one or more proxies used to facilitate feedback collection. One example of a proxy is a load distribution proxy. The load distribution proxy is configured to distribute, for example, the load for scraping for feedback. Distributing the scraping load prevents, for example, the same source site from being repeatedly contacted/accessed from the same Internet Protocol (IP) address.

Another example of a proxy is a geographical proxy, which allows queries/scraping to be performed from what appears to be different geographical locations. For example, when collecting feedback such as business listings or search results for a specific geographic region of interest, the platform may use the geographical proxy to simulate being in a particular geographic location that is different from the actual location of the server from which the query is originating. This allows, for example, the platform to simulate a search engine query for a user residing in Boise, Id., even though the server making the search query is actually in Santa Clara, Calif. (because the objective is to obtain search results relevant to Boise).

As the feedback is collected, it is further ingested, analyzed, or otherwise processed by platform 102, as will be described in further detail below. In some embodiments, to facilitate the further processing of a collected feedback item, the collected feedback item is placed on a messaging bus, where the messaging bus is used to pass, publish, or otherwise send the feedback item throughout platform 102 to be acted upon by various consumers. Feedback items may be queued on the messaging bus so that they are not dropped from the platform. In one embodiment, the messaging bus is implemented with high reliability, for example, using RabbitMQ.

Various embodiments of feedback processing performed by platform 102 are described in further detail below.

External Data Source Integrator

As will be described in further detail below, the feedback data obtained from source sites may also be integrated or otherwise combined with other types of data to perform reputation processing such as score calibration (described in further detail below). Such other types of data include data obtained via external applications 208 of customers of reputation platform 102, such as customer relationship management (CRM) platforms, dealership management systems, etc. In some embodiments, this integration is performed by integrator 206.

In some embodiments, connectivity between reputation platform 102 and a subscriber's (or customer of platform 102) external applications is supported using the Secure Shell (SSH) or Secure File Transfer Protocol (SFTP), application programming interfaces (APIs), etc. In one embodiment, the integrator is implemented as a set of rules that are based on both the data from the customer's external system and the reputation platform.

The following is one example of integration of reputation platform 102 with a CRM platform (e.g., SalesForce). Suppose that the CRM platform provides information about transactions that occur to platform 102 (e.g., via the example connectivity described above). In one embodiment, the entity (who is a customer of the services provided by platform 102) defines a rule that reputation platform 102 is to send out a survey for every transaction (e.g., using feedback request engine 244, described in further detail below). Further, the customer can define rules that specify different types of requests to be sent for different types of transactions. For example, in the case of a dealership, AutoBest can specify a rule where if a transaction was the sale of a specific car model, then the feedback request engine of platform 102 should send a survey pertaining to that particular car model (versus another model of car).

Real-Time Processing

Real-time processing engine 210 is configured to perform (near) real-time processing of feedback items that are collected (e.g., using feedback collection engine 202, as described above). In this example, real-time processing engine 210 includes tagging engine 212 and queueing engine 214.

Tagging

In this example, tagging engine 212 is configured to assign tags to a collected feedback item, where in one embodiment, the tags include metadata describing or indicating characteristics of the feedback item. The characteristics of the feedback item are determined based on an analysis of the feedback item. As will be described in further detail below, the tags are used to determine further downstream processing of the feedback item.

Consider, for example, a feedback item that is a review. One example set of tags is one that includes metadata indicating overall sentiment (e.g., positive, negative, neutral, N/A) of the review, categories or topics described in the review, the local sentiment of each category or topic in the review, impact of each category or topic on reputation score (described in further detail below), etc.

In this example of a review, in order to determine such tags, analysis of the characteristics of the review is performed. For example, a rating accompanying the review (e.g., a star rating provided by the review author) is obtained. The accompanying rating is used to determine an overall sentiment for the review (e.g., whether the overall sentiment of the review is positive, negative, or neutral). As another example, the overall sentiment for the review may be determined using sentiment analysis techniques.

Text analysis is also performed on the review to determine the content of the review, such as what categories or topics are discussed in the review. The text analysis may be determined from keyword determination, an analysis of phrases in the review, etc. For each of the topics or categories identified in the review, a sentiment for a given topic or category (referred to herein as the "local sentiment" specific to the category) is also determined, for example, by performing sentiment analysis of the text.

As one example, suppose a review for one of AutoBest's dealerships is received. The review is accompanied by a four star rating (out of five stars). The four star rating is used to determine that the overall sentiment expressed by the review is positive. A text analysis is used to determine that the dealership review includes topics such as sales and service. Sentiment analysis is performed for each of the topics to determine what was the reviewer's sentiment with respect to sales, and what was the reviewer's sentiment with respect to service. For example, based on the sentiment analysis of text related to sales, it is determined that the reviewer is neutral on sales, but based on the sentiment analysis of text related to service, the reviewer was positive on service.

Various other types of tags may be applied to the feedback item based on the analysis of the feedback item. As another example, a review may be tagged as a rant if the comment length equals or exceeds a threshold (e.g., 200 characters). A feedback item may also be tagged with the source of the feedback item (e.g., what source site the feedback item was collected from). As will be described in further detail, using the techniques described herein, a feedback item may be tagged as having characteristics that have been identified as strengths or weaknesses of an entity. For example, it may be determined that the topic or category of sales is a weakness for an auto dealership. If a review is collected that, after analysis, is determined to include the topic of sales, the review is tagged as including a category that has been identified as a weakness for the entity that is the subject of the review. Specialized processing for handling reviews that discuss topics that are weaknesses may then be performed, as will be described in further detail below.

Different types of feedback items may be tagged with different types of characteristics. In the above example, tagging of a review was described. For another type of feedback, such as a listing, other types of tags may be determined and applied. For example, the accuracy of a listing can be determined, where the accuracy indicates how much of the information in the listing is correct. A tag indicating an accuracy of a listing is then applied to the listing. Other tags that may be applied include tags indicating inaccurate or incorrect data (e.g., a wrong phone number), tags indicating missing information (e.g., missing hours), etc.

In some embodiments, the tagging is performed according to rules that indicate the conditions (e.g., presence of a category, certain overall sentiment, listing accuracy, etc.) on which a tag should be applied. The tagging rules may be dynamically determined based on ongoing processing performed by platform 102. For example, the categories that are strengths and weaknesses may change over time (e.g., as an entity turns its weaknesses into strengths). As will be described in further detail below, what categories are strengths or weaknesses is determined in an offline/backend mode that analyzes a corpus of numerous feedback items. This analysis is then used in a feedback loop, where, for example, for a category newly identified or updated as a weakness, a new tagging rule is implemented to tag any reviews that include that category that an entity is weak in.

As will be described in further detail below, depending on the tags applied to a collected feedback item, various types of (near) real-time actions may then be performed.

Queuing

In one embodiment, based on the tagging applied to a feedback item (where there may be one or more tags applied to a feedback item), the feedback item is routed into one or more queues by queueing engine 214. In various embodiments, each queue has a corresponding workflow to be performed on feedback items placed in the queue. Each queue may also have an assigned service level agreement.

For example, suppose that a review for an AutoBest dealership has been tagged as having a negative overall sentiment and having discussed parking (an example of a category) with negative category sentiment. The review is placed in a queue for all reviews that are negative, so that they can be addressed or responded to immediately. The review is also placed in a queue for addressing parking. As another example, suppose that another review has been tagged to indicate that it discusses a category that has been identified as a weakness. The review is then placed in a queue for handling feedback items that pertain to weaknesses. As yet another example, a review that has been tagged as a rant is placed in a queue for handling rants. As yet another example, a queue can be created for handling all feedback items from a particular source.

As described above, each queue has a corresponding workflow to be performed on feedback items that are placed in the queue. In one embodiment, the workflow includes generating a ticket for action(s) to be taken with respect to a feedback item in the queue. The actions include those that are to be taken immediately, in (near) real-time. Consider, for example, a queue for feedback items that have been tagged as having included a weakness. A ticket may be generated to perform the action of automatically alerting a relevant person at the entity that was the subject of the feedback item that included a category identified as a weakness. For example, if it has been determined that the service department is a weakness of AutoBest that is causing reviewers to view AutoBest negatively (and is hurting AutoBest's online reputation), then Alice may be notified any time a review about the service department is received. Further details regarding alerts will be described below. Thus, reviews with weaknesses can be surfaced so that weaknesses can be proactively managed and transformed into strengths. Similarly, reviews that include signals that are predicted to precede sharp drops in reputation scores may also be tagged in real-time (i.e., those signals indicate a risk of a drop in online reputation), where those signals are determined using virality cause determination (e.g., risk management) techniques that are discussed in further detail below.

As another example of a workflow, consider a review that has been tagged as having a negative sentiment (because it's overall star rating was one star out of five) or a survey that indicates a bad experience. Such pieces of feedback may be automatically tagged (based on a sentiment analysis of the feedback items) and placed in a queue, where the workflow, for example, is as follows. A ticket is generated. A confirmation is sent to an author of the feedback item (e.g., the person who wrote the review or completed the survey), where the confirmation includes a message (e.g., apologizing for the author's poor experience), along with an indication that their feedback is being tracked internally with a ticket (which may be identified by an identifier). The author may then use the identifier to check on the status of their ticket (e.g., when calling into a phone center).

Database

As described above, tagged feedback items are placed (based on their assigned tags) in queues for (near) real-time processing. In some embodiments, the tagged feedback items are also stored to a database (216), where the stored items may be used to perform various offline/backend processing, as will be described in further detail below. In various embodiments, the database is implemented using ElasticSearch, MongoDB, etc. Different types of feedback items may be stored as objects of different types. For example, a review may be stored as a corresponding review object, a survey as a survey object, a listing as a listings object, a social comment as a social comment object, etc. Each of the different objects may have certain applicable properties that are specific to the object type. For example, a review object may include an overall rating, a comment, a source, a timestamp of when it was collected, etc. A listings object, in various embodiments, may have a name, an address, a phone number, a source, etc.

Backend Processing

As will be described in further detail below, backend processing engine 218 is configured to perform various types of offline processing/analysis/evaluation of the feedback objects stored in database 216. In one embodiment, the backend processing engine is implemented as a set of running database processes.

Reputation Scoring

Reputation scoring engine 220 is configured to generate reputation scores for an entity (which may have multiple locations). A reputation score is a measure that indicates an online reputation of an entity (e.g., a tenant and/or its locations). If the entity has multiple locations, then each of the locations may have its own individual reputation score. As will be described in further detail below, reputation scores (of which there may be various types) are calculated as a function of a variety of factors In one embodiment, a reputation score is generated as a (linear or non-linear) combination of weighted factors/score components. Non-linearity in the score may be due to components such as review volume (which may be low in some cases). In one embodiment, reputation scores are generated based on an analysis of the various types of feedback that are collected, such as search data (obtained as part of performing a search of an entity using a search engine), listings data, review data, etc.

As described above, different types of reputation scores may be generated. One example of a reputation score is an overall or composite reputation score for an entity. An overall reputation score may in turn be based on various sub-components. These sub-components may in turn be other reputation scores, examples of which include, in various embodiments, scores for sentiment, visibility, and engagement.

In one embodiment, a sentiment score for an entity is a measure indicative of a user's online sentiment with respect to the entity. The sentiment score may be computed based on an analysis of user feedback found in items such as reviews, surveys, social media, etc. The sentiment score may be computed based on a variety of factors that make up components of the sentiment score, such as average ratings on reviews, NPS (net promoter score), ratings gaps, social sentiment on source sites such as social networks, the time at which reviews are posting or commenting on posts by the entity, etc.

A visibility score provides a measure indicative of how visible the entity is to online users. The visibility may be a function of how many directories on which the entity is listed, how many reviews the entity is requesting, the entity's seller ratings, etc. An engagement score provides a measure indicative of how well the entity is engaging with users. The engagement score may be determined, for example, on how the entity is engaging with or otherwise taking action with respect to feedback items such as reviews, surveys, social actions, etc.

Reputation scores specific to particular types of feedback items may also be generated. Examples of such per-feedback type reputation scores include scores pertaining to reviews, scores related to listings, etc.

For example, with respect to reviews, one or more scores relating to an assessment of the entity's performance with respect to reviews may be computed based on factors specific to reviews. Review volume, review sentiment, the diversity of sites from which reviews are collected, etc. are but some examples of factors that may be used in computing a score.

With respect to listings, one or more scores relating to an assessment of the entity's performance with respect to listings may be computed based on factors such as listings coverage (e.g., the number of source sites that a location's listing is posted on), whether the location's listings are on appropriate sites (e.g., industry-specific sites, such as whether doctors have listings on sites such as Vitals or Healthgrades), etc. Another example of a factor used to determine listing performance is listing accuracy, which is a measure of the accuracy of the listings posted for the location. The listings accuracy provides a measure indicative of a degree to which listings are correct (e.g., relative to "source of truth" data provided by the location). For example, it is determined whether the correct hours are listed on a listing. The listings accuracy may also be a determination of whether listings data is in agreement across various source sites. Listings for an entity may also be graded or scored based on completeness. For example, listings may be scored according to the presence or absence of information pertaining to one or more categories. Suppose that there are four categories, name, address, phone number, and operating hours, which are considered for a listing. In this example, each of the four components/categories of a listing equally contributes 25% to a total listing completeness score of 100% (although the weights need not be equal). If one out of the four components is missing from the listing, then the profile is scored as being 75% complete. Completeness scores for individual listings on various source sites may be determined (where different listings on different directory sites may have different levels of completeness), with the individual completeness scores aggregated to determine an overall or composite listing completeness score for the entity location.

In some embodiments, scoring of listings' performance is based on local searches and profile quality. A local search includes performing a search of an entity (location) on a search engine such as Google. The results of the search are then evaluated. For example, it is determined what websites the entity is listed on, and whether it is a positive or negative site for the entity to be listed on. For example, if the entity is listed on a site that reports ripoffs, this is determined to have a negative impact on the reputation of the entity.

As another example of search result information that is evaluated, when using the Google search engine, when searching for a business, a knowledge panel appears in the search results, where the knowledge panel is used to present or list information about the entity. In one embodiment, the contents of the knowledge panel are evaluated to determine the quality of the listing in the knowledge panel. For example, it is determined whether a knowledge panel even appears in the search results (where it is negative if it does not appear). If the knowledge panel appears, it is then determined whether the panel links or otherwise provides access to information about the location, such as to reviews or a home page of the location.

When performing the search query using the search engine, search queries at different levels of granularity may be performed. For example, instead of, or in addition to, performing a search specifically for an entity location, a more general search is performed to determine whether the entity location appears in the results for the more general search. Take, for example, a specific auto dealership for a particular brand. A general search for the brand's auto dealerships in a geographic region (e.g., county or city) is performed. It is then determined whether the specific auto dealership appears in the results, in the top N results (e.g., in a three-pack of websites provided by the search engine), etc. Thus, the performed searches are used to determine how the entity location appears in search engine queries.

As exemplified above, the local search evaluation ties or otherwise aggregates various types of information, as there are various factors that contribute to how an entity location appears in searches. For example, the entity location's appearance (or non-appearance) in search results may be because they have not claimed a Google listing, the incorrect home page is connected to their Google listing (causing reviews to not flow to the right location), the entity location does not have enough Google reviews (and is therefore not showing up in the top three search results), etc.

Thus, as described above, scoring (of various aspects of an entity's reputation) is determined. Generated scores may be broken down across various dimensions. For example, for multi-location entities, a composite score for the entity may be broken down by separate per-location scores. As will be described in further detail below, scores may also be broken down at a component level, for example, to show the impact of individual factors on reputation scoring.

In some embodiments, the reputation scoring engine is configured to perform benchmarking. Score benchmarking includes generating reputation score(s) for different groups of cohorts (e.g., a set of locations against a baseline set of locations), and performing a comparison of the scores.

In some embodiments, the above scoring is implemented as a scoring database process. As one example, the data process, when running or executing, obtains the feedback items for an entity (that is being scored) that have not yet been evaluated as part of scoring (e.g., that day, or any other time period as appropriate), and adds the feedback to a scoring algorithm.

Example Score Generation

Example ways of computing a composite reputation score are as follows.

(1) Base Score

First, the reputation scoring engine computes a base score "B" that is a weighted average of all of the star ratings of all of the individual reviews on all of the sites deemed relevant to an entity's business:

$$B = 100 \cdot \frac{\sum_{i}^{N_r} s_i w_i}{\sum_{i}^{N_r} w_i} \cdot I(N_r - N_{min} > 0)$$

where "$N_r$" is the total number of reviews, "$s_i$" is the number of "stars" for review "i" normalized to 10, "$w_i$" is the weight for review "i," $\theta$ is the Heaviside step function, and "$N_{min}$" is the minimum number of reviews needed to score (e.g., 4). The factor 100 is used to expand the score to a value from 0 to 1000. S_i may also be normalized.

One example of the function "$w_i$" is as follows:

$$w_i = f(D_A, T_i, P_i, R_A, S_F, L_F)$$

Where in one embodiment:

$$w_i = D_A \cdot T_i \cdot P_i \cdot R_A \cdot S_F \cdot L_F$$

In the above, "$D_A$" is the domain authority, which reflects how important the domain is with respect to the business. As one example, a doctor-focused review site may be a better authority for reviews of doctors than a general purpose review site. One way to determine domain authority values is to use the domain's search engine results page placement using the business name as the keyword. Which domains have predictive value can also be evaluated, and optimal decay rate may be calibrated.

"$R_A$" is the reviewer authority. One way to determine reviewer authority is to take the logarithm of 1+the number of reviews written by the reviewer. As explained above, a review written by an individual who has authored many reviews is weighted more than one written by a less prolific user. Machine learning techniques, in which calibration is performed by using training data, may also be performed.

"$S_F$" is the social feedback factor. One way to determine the factor is to use the logarithm of 1+the number of pieces of social feedback a review has received.

"$L_F$" is the length factor. One way to specify this value is to use 1 for short reviews, 2 for medium reviews, and 4 for long reviews.

"$T_i$" is the age factor. One way to specify this factor is through the following:

$$T_i = e^{-\omega \cdot (a_i)}$$

where $\omega$ is the time-based decay rate.

"$P_i$" is the position factor for review "i." The position factor indicates where a given review is positioned among other reviews of the business (e.g., it is at the top on the first page of results, or it is on the tenth page). One way to compute the position factor is as follows:

$$P_i = e^{-\frac{p_i}{\lambda}}$$

where $\lambda$ is the positional decay length.

In some cases, a given site (e.g., site 110) may have an overall rating given for the business on the main profile page for that business on the site. In some embodiments, the provided overall rating is treated as an additional review with age $a=a_0$ and position $p=p_0$ and given an additional weight factor of 2.

(2) Normalization

Once the base score has been computed, it is normalized (to generate "$B_{norm}$"). In some embodiments this is performed by linearly stretching out the range of scores from 8 to 10 to 5 to 10 and linearly squeezing the range of scores from 0 to 8 to 0 to 5.

Optional Correction Factors

In some embodiments, a correction factor "C" is used for the number of reviews in a given vertical and locale:

$$C = a + b \cdot \frac{2}{\pi}\left(\frac{2 \cdot N_r}{\underline{N_r}}\right)$$

where "$N_r$" is the number of reviews for the business and the median number of reviews is taken for the business's vertical and locale. An example value for "a" is 0.3 and an example value for "b" is 0.7.

One alternate version of correction factor "C" is as follows:

$$C = a + b \cdot \frac{2}{\pi}\left(\frac{2 \cdot N_r}{\max\left(\underline{\min(N_r, N_{min})}, N_{max}\right)}\right)$$

where "$N_{min}$" and "$N_{max}$" are the limits put on the comparator "$N_r$" in the denominator of the argument of the arctan in the correction factor. An example value for "$N_{min}$" is 4 and an example value for "$N_{max}$" is 20.

A randomization correction "R" can also be used:

$$R = \min\left(1000, C \cdot B_{norm} + \frac{\mod(uid, 40) - 20}{N_r}\right)$$

where "C" is a correction factor (e.g., one of the two discussed above), "$B_{norm}$" is the normalized base score discussed above, and "uid" is a unique identifier assigned to the business by platform 102 and stored in database 216. The randomization correction can be used where only a small number of reviews are present for a given business.

Another example of "R" is as follows:

$$R = \max(0, C \cdot B_{norm} - 37.5 \cdot e^{-0.6 \cdot \alpha})$$

where "$\alpha$" is the age of the most recent review.

Additional Examples of Scoring Embodiments

As explained above, a variety of techniques can be used by the reputation scoring engine in determining reputation scores. In some embodiments, scores for all types of businesses are computed using the same sets of rules. In other embodiments, reputation score computation varies based on industry (e.g., reputation scores for auto/car dealers using one approach and/or one set of factors, and reputation scores for doctors using a different approach and/or different set of factors). Reputation score computation may also vary on other dimensions, such as country. The reputation scoring engine can be configured to use a best in class entity when determining appropriate thresholds/values for entities within a given industry. The following are yet more examples of factors that can be used in generating reputation scores.

Review volume: The volume of reviews across all review sites can be used as a factor. For example, if the average star rating and the number of reviews are high, a conclusion can be reached that the average star rating is more accurate than where an entity has the same average star rating and a lower number of reviews. The star rating will carry more weight in the score if the volume is above a certain threshold. In some embodiments, thresholds vary by industry. Further, review volume can use more than just a threshold. For example, an asymptotic function of number of reviews, industry, and geolocation of the business can be used as an additional scoring factor.

Multimedia: Reviews that have multimedia associated with them (e.g., a video review, or a photograph) can be weighted differently. In some embodiments, instead of using a separate multimedia factor, the length score of the review is increased (e.g., to the maximum value) when multimedia is present.

Review Distribution: The population of reviews on different sites can be examined, and where a review distribution strays from the mean distribution, the score can be impacted. As one example, if the review distribution is sufficiently outside the expected distribution for a given industry, this may indicate that the business is engaged in gaming behavior. The score can be discounted (e.g., by 25%) accordingly. An example of advice or recommendation for improving a score based on this factor would be to point out to the user that their distribution of reviews (e.g., 200 on site 110 and only 2 on site 112) deviates from what is expected in the user's industry, and suggest that the user encourages those who posted reviews to site 110 to do so on site 112 as well.

Text Analysis: Text analysis can be used to extract features used in the score. For example, reviews containing certain key terms (e.g., "visited" or "purchased") can be weighted differently than those that do not.

Reputation Scoring Calibration

Reputation scoring calibration engine 222 is configured to calibrate reputation scoring to track or correlate to a target metric. For example, in some embodiments, reputation scores are computed based on a variety of weighted factors. Calibrating reputation scoring to a metric includes adjusting weighting such that the reputation scoring correlates or tracks to a target metric. Performing such scoring calibration allows a reputation score to be a proxy for other metrics such as revenue or search ranking. Coupled with the impact analysis described in further detail below, the score calibration allows for a bridge to determine what are the categories, components, or factors (that contribute to reputation scores) that act as levers for an entity's reputation that bring the largest opportunities to change (e.g., improve) the target metric to which the reputation score is calibrated. For example, the calibration can be used to determine how traffic to an entity's website (a component used to determine a reputation score) contributes or otherwise correlates to vehicle sales. Other examples of metrics include sales, ROI, search ranking, customer retention metrics, etc.

In one embodiment, performing the calibration includes solving an optimization problem. As one example, the calibration is based on running a regression of the various components of a reputation score versus a target metric.

Suppose, for example, that reputation scoring is to be calibrated to correlate or map to search rankings for optometrists, that is, how optometrists rank relative to one another as a result of a search query (e.g., is the optometrist listed first, second, etc.). The calibration is performed such that the reputation scoring tracks with an entity's search ranking. That is, an optometrist with a higher reputation score than another optometrist should be more likely to rank higher in searches as compared to the other optometrist with the lower score.

One example of calibrating the reputation scoring to the optometrist search ranking is as follows. For every optometrist in each of the 50 largest US markets (any other selection criteria may be used, as appropriate), the top 20 optometrists (or any other number, as appropriate) ranked at the top of Google searches (or any other search engine, as appropriate) are identified. The scoring calibration engine is configured to determine how each of the factors (e.g., review volume, sentiment, responsiveness, listings accuracy, etc.) of the reputation score being calibrated drives search rankings. In some embodiments, a model is determined for the scoring. The weights attributed to the factors are then tuned to solve an optimization problem to optimize the weights to minimize, based on the search ranking information, the number of times a lower scoring entity outranks a higher scoring entity.

The following is another example of calibrating reputation scoring to a target metric. In this example, the target metric to which reputation scoring is being calibrated is return on investment (ROI) metrics such as sales. For example, suppose that reputation scoring is being calibrated for auto sales for a set of AutoBest dealerships. In this example, in order to obtain ROI data, the platform imports data sets such as car sales data for analysis. The information may be obtained from a source external to the reputation platform. As one example, the sales data is obtained via integrator 206.

The score calibration engine is configured to determine, for example, a relationship between score points and car sales (e.g., that an increase of 30 reputation score points correlates to an increase of 1% in sales). By determining the optimal weights for factors such that reputation scoring relates to sales, the impact of scoring factors (or groups of scoring factors) on sales may also be determined. For example, the relationship between factors such as numbers of reviews, change in average rating, etc. and car sales by month may be determined. Such information may then be provided to users associated with the auto dealership. This would allow Alice to be presented, for example, information indicating that increasing the overall reputation score by 100 points relates to selling 3% more cars, or that an increase in a certain factor (e.g., number of reviews or review responsiveness) relates to a certain amount of increase in sales.

In some embodiments, the scoring calibration is performed by using data aggregated from multiple entities (e.g., across an industry) to determine a model that indicates how various aspects of reputation scoring relate to a metric. For example, with respect to the above example of calibrating reputation scoring to car sales, while there may be noise in the analyzed feedback/sales data, since multiple factors may contribute to the sale of more/less vehicles for a single dealership, by using the data aggregated from multiple dealerships, signals may be better determined that indicate for example, that dealerships that perform in certain particular aspects of reputation management have a relates increase in sales on average.

Further details and examples regarding scoring calibration are described below

Determining Insights

The online reputation for entities (e.g., as measured using the reputation scoring described above) may vary over time, due to a variety of reasons, which may not be clear to users associated with an entity. For example, given the voluminous posts made on numerous sites, it can be difficult for Alice and Bob to understand the reasons behind changes in their reputation score over time. Insights engine 224 is configured to determine insights about an entity's reputation, for example, determining the reason behind changes in a reputation score (or changes in sub-components of the reputation score).

As described above, reputation scoring is performed based on numerous factors and components related to various aspects of an entity's reputation. As will be described in further detail below, insights may be generated off of any components of reputation scores. For example, consider the reputation metric volume of reviews, which may be used as a component in determining a reputation score, and which may itself be computed as a function of a variety of components. If the review volume has decreased, the insights engine is configured to determine, for example, that the reason the review volume has decreased is due to click rates on review requests going down (where click rates have been identified as a component in determining review volume). As another example, if the overall rating for an entity has decreased, the insights engine can determine that it was due to the impact of the entity's average Google rating going down. As another example, the insights engine can determine that an entity's search rankings are going down because their listings are inaccurate and the entity's volume of reviews is also decreasing.

Thus, not only can platform 102 generate reputation scores, but it is also configured to determine insights into why the score is behaving in a certain manner, for example, by determining what attributes or factors are having the largest impact on reputation score.

In some embodiments, insights into why reputation scores have changed are determined by computing the impact of different attributes on a reputation metric or score. For example, with respect to visibility, the insights engine may determine the top several attributes that are affecting an entity's online visibility, highlighting those factors that have the largest impact (e.g., the number of web sites that the entity has listings on, the activity level of a listing, the completeness or accuracy of listings, the consistency of the information across listings across the Internet, etc.).

As reputation scores may be generated for various aspects of an entity's reputation, at various levels, insights may also be generated at various levels. For example, as described above, scores for different types of feedback items may be generated. As one example, by determining the impact of business listings on other score components or reputation behavior, such as traffic, the insight engine may determine that because a number of locations do not have any phone numbers listed, this is causing a loss of traffic, because people are not calling into locations before visiting.

In one embodiment, impact analysis engine 226 is configured to determine an impact of a reputation factor or attribute on reputation scoring, where, in some embodiments, the reputation factors/attributes are used as components in reputation scoring. For example, a reputation score may be modeled or computed as a combination of weighted scoring components. In one embodiment, determining an impact of a reputation factor or attribute on reputation scoring is performed as follows. First a baseline model is generated that determines, for any entity (e.g., average or typical entity in an industry), an expected reputation score, as well as an expected impact of each scoring factor or component on the reputation score. Determining an expected impact of a scoring factor on reputation score includes quantifying or otherwise determining an expected change in reputation score given different values for the component. This processing is performed for each of the components of the reputation score under consideration. In some embodiments, the baseline model is generated based on an analysis of feedback data for numerous locations (e.g., all of the entities in an industry). Using collective data across multiple entities and locations allows for the determination of how various reputation scoring components would impact a typical location, where a scoring component may have different reputation score impacts for different locations (e.g., a scoring component such as review volume may have a larger impact on one location or entity versus another).

The baseline impact model that is generated may then be used to determine an impact model for a specific entity or set of entities. In some embodiments, the entity-specific impact model is generated by performing a normalization of the baseline impact model, where the normalization is based on an evaluation of the feedback data specific to the entity. For example, suppose that according to the baseline model, a decrease in review volume by 10% is expected to cause a decrease in reputation score by 30 points. However, for a specific entity location, based on its own specific feedback data, with the same review volume decrease, the observed decrease in reputation score is 50 points. That is, the impact of volume to search results can be different for different locations. Relative to the baseline model, the location-specific model's impact for review volume on reputation score should be larger, and in this example, is normalized by scaling the baseline's impact by 50/30 (ratio of score changes) to explain the difference for the specific location. In other embodiments, the normalization is performed by adding an additional factor (such as "brand") that has its own impact, in order to explain why the location-specific model deviates from the baseline model (i.e., to account for the gap between the expected drop and the observed actual drop).

The following is an example of determining an impact of a reputation factor on reputation scoring for an entity. In this example, the impact of categories or topics on the sentiment for an entity location is determined.

Consider, for example, the hospital ACME. It is desired by ACME to determine how the sentiment for various topics or categories (e.g., cleanliness, parking, wait time, food, doctor competence, bedside manner, etc.) expressed in reviews or surveys (or any other type of feedback, as appropriate) impacts the overall sentiment score (e.g., review rating) for ACME.

First, as described above, a baseline model is generated to determine the expected overall rating for a review of an average hospital (e.g., a typical hospital in the industry, not specifically ACME), as well as the expected impact that sentiment for different topics has on the overall rating for a typical hospital.

In this example, to generate the baseline model for a typical hospital in the hospital industry, all reviews about all hospitals in the industry are obtained from database 216. This allows an industry baseline to be generated. Key categories that reviewers write about (e.g., cleanliness, parking, wait time, food, doctor competence, bedside manner, etc.) are identified from the reviews (e.g., using natural language processing techniques).

For every single review across all hospitals, the overall rating for the review is also obtained. The overall rating for any review is a function of everything a reviewer describes about the subject of the review. The insights engine is further configured to determine whether the review is focused on any of the identified key categories. In some embodiments, this includes tagging each review with whatever categories (in the key categories) are present in the review. For any categories that the review is focused on, the local sentiment with respect to each of those categories is determined (for example, based on sentiment analysis). That is, for each previously identified key category, it is determined whether the category is present or absent in the review, and if present, what the local sentiment for the category was (e.g., positive, neutral, or negative). In some embodiments, the absence of the category is also recorded (and may be given, for example, a local sentiment of N/A).

In some embodiments, based on the category tagging and local sentiment analysis of the categories tagged in individual reviews in a corpus of reviews (where the tagging may have been performed, for example, by tagging engine 212 as the reviews were collected), the insights engine breaks down each of the reviews to determine how much each of the categories contributes to the overall sentiment score. In some embodiments, this is done by building a machine learning model. As described above, the model is used to estimate, predict, or otherwise determine, given a review expressing a certain sentiment for a particular category (e.g., positive about food, negative about doctor competence, etc.), what is the expected impact on average overall satisfaction (e.g., star rating for a review). In various embodiments, the machine learning model is generated using regression (e.g., linear regression), decision trees, or any other machine learning techniques as applicable. As one example, a linear regression is run on the industry-wide data to determine a reputation scoring model that predicts that negative sentiment for food has a −0.1 impact on overall rating, while a positive sentiment for food has a +0.3 impact on overall rating, neutral sentiment has an impact of +0.1 impact on overall rating, etc. The regression analysis is performed for each of the categories.

Thus, the machine learning model generated using the industry-wide data provides a baseline of how impactful categories are in general (across the industry, not just specific to a particular entity or location). That is, the model determines how much of a typical entity's overall sentiment is driven by each score component (e.g., category).

In some embodiments, the baseline also indicates, when looking at the average entity, the expected amount of each type of sentiment for each of the categories. For example, for a hospital, the baseline indicates the average or expected amount of each type of sentiment for the categories in which a typical hospital is evaluated (e.g., how much do people complain about wait time at the typical hospital, how much do people complain about the emergency room for the average hospital). The amount of feedback that an entity receives for each of the categories may also be used to weight the impact of each factor.

In some embodiments, the regression analysis is also used to determine an expected baseline rating that would be given to a review, if there were no categories (and thus, no sentiment expressed for any category) mentioned in the review.

After determining the above industry-wide baseline for how impactful categories are generally for a typical hospital, the impact of the categories on the overall sentiment for a specific hospital is determined. For example, for the same categories evaluated in the industry-wide baseline, the review data specific to the tenant is evaluated to determine reviewer's sentiment with respect to those categories, as well their impact on the rating for the location.

The following is an example of how the industry-wide baseline is used to determine how overall sentiment for ACME is driven by each category. Suppose, for example, that based on the industry-wide baseline, that the starting overall sentiment score for a typical review (prior to any changes due to sentiments for categories in the review) is expected to be 4 stars. Suppose that based on the industry-wide model, for any given typical hospital, a negative sentiment for food is expected to have an impact of −0.2 stars on the overall sentiment, while negative sentiment for doctor competence is projected to have an impact of −3 stars (or points or any other appropriate unit for measuring sentiment) on overall sentiment. That is, for a typical review of a typical hospital in the hospital industry, if the review had expressed negative sentiments for both food and doctor competence (while not expressing sentiment for any other category in the review), the expected overall sentiment or rating for the review would be 4−0.2−3=0.8 stars, based on the industry-wide modeling.

Now suppose that the reviews specific to ACME are under consideration in order to determine how different categories specifically impact ACME (as opposed to an average or typical hospital in the industry). Suppose that in one of the ACME reviews, it is determined that the review has expressed negative sentiments for both food and doctor competence (with the review having not made any mention of any other categories), where the review has an overall rating of 1 star. The 1 star rating of the review is in contrast to the expected overall rating of 0.8, as computed above. This may be an indication that, as compared to a typical reviewer of a typical hospital (according to the industry-wide modeling), for this reviewer, the negative sentiments for the categories of food and doctor competence contributed in a smaller way or magnitude to their overall rating for ACME. In one embodiment, to determine how negative food and doctor competence specifically affect or impact ACME, the baseline expected category impacts are normalized or adjusted for ACME. For example, each of the baseline category expected impacts are multiplied by the ratio of the observed sentiment change over the expected sentiment change. In this example, for the ACME review under consideration, the expected −0.2 impact for negative sentiment on food is multiplied by 3/3.2 to result in an adjusted impact of −0.19 for this particular review of ACME. Similarly, the expected −3 impact for negative sentiment on doctor competence is multiplied by 3/3.2 to result in an adjusted impact of −2.81 for this particular review of ACME.

Thus, a per-review adjusted impact for each of the sentiments of each of the categories is determined for that one ACME review. In this example, the normalization processing described above is performed for each review of ACME. Aggregate adjusted impacts given sentiments of categories may then be computed for ACME. For example, all of the adjusted impacts of negative sentiment on food that were computed across the reviews of ACME may then be rolled up, such as averaged, to determine an average impact (on overall local sentiment) of negative local sentiment for food at ACME. An overall impact of food generally for ACME (regardless of sentiment) may also be computed by aggregating the impacts of the various sentiments. Thus, as shown in the above, industry-wide review data has been used to generate local insights into the impact of category sentiments on individual entities.

In the above example, the normalization was performed on a per-review basis to account for the fact that, for the reviewer of that review, their sentiment for a category impacted their overall sentiment for ACME in a way that was different than what would be expected for a typical review for a typical hospital (according to the industry baseline). In some embodiments, rather than adjusting or normalizing baseline expected impacts, the discrepancy in expected sentiment score versus observed sentiment score (given the local sentiments for categories in a real review) is accounted for using another factor, such as "brand." For example, while the expected score for the review was 0.8, but the actual observed sentiment was 1 star, the difference of 0.2 may be attributed to the "brand" factor. That is, for that particular review, the reviewer implicitly gave ACME+ 0.2 sentiment points because of the brand.

In this way, by first creating a baseline impact model, entity-specific impact models may be generated by performing normalization on the baseline impact model. As will be described in further detail below, benchmarking may then also be performed to determine, for different groupings of entities, how the same scoring component impacts one group versus another (e.g., does food affect the reputation for one hospital much more than it does for a competing hospital?).

In some embodiments, the various reputation attributes (which are used as scoring components in the model of the reputation scoring) are prioritized based on their impact on reputation scoring. The determined (and prioritized) insights may then be used to drive various types of outputs. For example, insights may be presented to users, but need not be. In some cases, some insights are not surfaced, but are instead propagated throughout the platform for use.

As one example of how prioritized impacts are used to drive further downstream processing, suppose that it is determined that non-responsiveness to negative reviews on Google has a disproportionate impact on reputation score (as compared to other factors). The non-responsiveness is then prioritized higher, such that actions to address the non-responsiveness are taken. For example, alerts may be sent to flag negative reviews on Google (as determined by the real-time processing/tagging, as described above) that have yet to be responded to.

In some embodiments, the determined impacts may also be used to bootstrap and update the above mentioned modeling. For example, a determination of whether the sentiment for tags observed in real reviews had more or less impact than was expected or predicted by the model may be used to update the weighting of the model.

The impact determination processing described above may be re-run on a time driven basis (e.g., daily, weekly, or in real-time, etc.), as new feedback items are collected for analysis.

Further details and examples regarding generating a baseline model are described below.

Impact-Based Strength and Weakness Determination

One example type of insight that can be determined based on the impact analysis described above is whether some aspect of an entity's reputation is a strength or a weakness for the entity. In some embodiments, the determination of weakness or strength is made relative to a benchmark (e.g., a competitor of the entity, a "best-in-class" location, the entity itself in the past (e.g., a week ago, a month ago, a year ago, etc.)). That is, for the same reputation aspect, the techniques described herein may be used to determine whether an entity is strong or weak in that reputation aspect as compared to another group of entities.

As one example, for a target set of entities it is determined which scoring components/factors that affect reputation scoring are driving the target entity's score more or less versus those entities in a benchmark set of entities. For example, target and benchmark reputation scoring models are generated for the target and benchmark sets of entities, respectively, as described above (modeled using the same weights and factors, and by normalizing a baseline model using the respective sets of feedback pertaining to the target and benchmark groupings of entities). For each factor in the reputation scoring, the values of the factor for the respective sets of entities are compared. The impact on reputation score due to that factor is estimated (e.g., using the normalization of the industry-wide baseline, as described above) for each set of entities. The difference in impact of the scoring factors computed for the two groups is determined. This impact comparison is performed for each factor of the reputation scoring. The scoring factors are then prioritized for the target set of entities based on the computed impact-difference between the two groups (e.g., by identifying the largest gaps in relative impact of the component on the sentiment for the target versus the benchmark).

The difference in impact of a factor may be used to perform further sub-analysis. For example, cascading insights may be determined, where the different in impact of a factor may trigger further determination of insights of sub-components/factor of the factor (which may in turn trigger further insight determination). As one example, if the reputation dimension of review volume is lower for a target entity versus the benchmark, factors that affect review volume are further evaluated (e.g., to determine why review volume is lower for the entity versus the benchmark). For example, it may be determined that click-through-rate is lower for the target entity versus the benchmark (based on a comparison of click-through-rate for the entity and the benchmark). As another example, it may be determined that the difference in review volume is due to the benchmark sending out SMS (short message service) review requests, while the entity does not have any (and instead uses only email review requests) (or at least, the SMS review request is one determined difference between the entity and the benchmark, which may explain the difference in review volume, which is having an impact on reputation score).

Thus, more directed analysis can be used to determine a root cause for drops in reputation scores for the entity versus the benchmark. In this way, the biggest opportunities for the entity to improve upon to match a benchmark (or the biggest differences between the entity and the benchmark) may be determined and presented.

Thus, whatever factors are driving down the target's reputation score versus the benchmark is identified. The identification of factors also provides the reason behind the drop in reputation score (e.g., because the selected set's review volume was much lower than the review volume for the benchmark, which drove the largest impact on reputation score).

As another example, consider the analysis of the impact of topics or categories on sentiment score for a specific target entity relative to a benchmark. Determining whether a category is a strength or a weakness for the entity may be performed as follows. The impact of the category on the sentiment score for a benchmark is also determined. The industry-wide baseline described above is one example of a benchmark. Benchmarks may be other specific groupings of locations, where the benchmark impact modeling is performed as described above (e.g., for a competitor, for another location of a multi-location entity, for the tenant itself in some past time period, etc.) using, for example, the review data specific to the benchmark set of locations. That is, the gap, delta, or difference in the respective impacts determined for the target entity and the benchmark is computed. Based on the gap, it can be determined whether the category is a strength or a weakness for the target entity. For example, suppose that a category has a negative impact on the sentiment for a target entity. However, it is determined that the category also has a negative impact on a competitor, and that, in fact, the negative impact is much larger for the competitor. In this case, the category, despite having a negative impact on the target entity, is actually a strength of the entity (relative to the benchmark), because it is less of a negative for the target relative to the benchmark. Further analysis may then be performed based on the impact benchmarking. For example, there may be various benchmark sets, and various local insights and specific strengths and weaknesses relative to industry benchmark, key competitor benchmark, or baseline benchmark may be determined and presented.

The relative gaps for each category against a benchmark may be used to label whether a category is a strength or a weakness (or neither) for the target entity versus the benchmark entity. Those categories where the impact on the target entity is ahead of or more positive than the impact on the benchmark may be labeled as strengths. Those categories where the target entity lags behind the benchmark in terms of impact may be labeled as weaknesses. Those categories where the impact is the same (or within a threshold range) for both the target and the benchmark may be labeled as neither.

For those factors determined to be weaknesses (where one entity is weaker with respect to that category as compared, or relative, to a benchmark), further analysis may be performed to determine the reason why that factor (or group of factors/attributes) is a weakness. This includes performing a comparison, between the target and the benchmark, of the various components that make up the factor determined to be a weakness.

Based on the relative impact gaps between the target and the benchmark for score components or reputation attributes, those attributes (e.g., categories) may be prioritized. For example, strengths and weaknesses may be prioritized by the size of the gap in impact for the target versus the entity. As one example, those categories that are determined to be disproportionately impacting a target entity versus the rest of the industry, such as a competing hospital, etc. (e.g., with a larger gap in impact of the category on the target versus the baseline, where the target is lagging behind the baseline) may be prioritized higher. Those higher prioritized categories may be presented as the greatest opportunity, if addressed, for the largest improvement in overall sentiment (i.e., focusing on those categories prioritized higher would have the largest impact on improving sentiment, versus addressing another, lower-prioritized weakness). Thus, not only can it be determined what the impact of a category is on a target, but by performing the above benchmarking, it can be determined whether that category has a bigger relative impact on the target entity versus a competing hospital.

For example, suppose that ACME is the target of the strength/weakness analysis described above, and that ACME would like to benchmark itself versus a competing hospital, Beta. Using the techniques described above, it can be determined that while doctor competence for ACME was in line with Beta, food was negative for ACME while food was a positive for Beta. Thus, in this case, it is determined that for patients who are deciding between ACME and Beta, doctor competence is viewed similarly, but food is the largest differentiator.

As another example, if the industry baseline is used as a benchmark, it can be determined that while food is a negative for the industry as a whole, it is a negative for ACME. However, sentiment for doctor competence for ACME is in line with expectations (the industry). Food is then a weakness for ACME, and should be prioritized as an issue for ACME to address in order to at least meet industry averages.

Without looking at such benchmarks as described above and only looking at ACME's reviews in isolation, someone browsing ACME's reviews might be alarmed about the complaints about doctor competence. However, by using benchmarks such as competitors, the industry, etc., it can be determined whether an issue is specific to only the entity, or if it is a common problem across multiple entities. As another example, suppose that based on the above analysis, it is determined that complaints (i.e., negative sentiment) about the category of emergency room wait time have an impact of −0.4 on ratings for ACME. However, based on the industry-wide baseline, it is determined that the average or typical impact of emergency room wait time is −0.7. Thus, while wait times are negatively affecting ACME's reputation, by performing the benchmarking described above, it can be determined that, in fact, ACME is outperforming the industry-wide average, and emergency room wait times are not necessarily an aspect that ACME needs to address at the moment in terms of customer satisfaction (where there may be other weaknesses that should be addressed first).

What categories are designated as strengths and weaknesses for a target entity may vary based on what set of entities constitutes or makes up the benchmark. For example, while ACME's food may be better than the industry average (and thus food is designated as a strength for ACME as compared to the industry), it may be worse as compared to the best-in-class hospital (and thus a negative for ACME relative to the best-in-class). By determining what the weaknesses are and understanding the benchmark, resources can be most efficiently directed to identify those specific areas that will have the largest opportunities for improving ACME's online reputation. For example, if it is determined that the category of emergency wait time is a weakness for ACME relative to the best-in-class hospital, then this can be presented to Bob, so that ACME will then know, out of all possible areas related to hospitals, they should further investigate the best-in-class hospital's approach to emergency wait time, as this is the most effective lever to effect positive reputation change. In this way, the ACME user can then determine, for example, that the best-in-class hospital has a mobile application ("app") that allows patients to sign in at home and to check emergency room wait times online. Further, the best-in-class hospital has valet parking, and thus no patient waits for more than 10 minutes in the waiting room.

Actions can be taken based on the benchmarking, such as surfacing and evaluating the specific pieces of feedback (for both ACME and the best-in-class hospital) that reference the waiting time category. Text analysis such as natural language processing (NLP) can then be used to summarize or distill down what words in the reviews are indicative of the category that is a weakness for ACME. The three items that are driving better sentiment for the best-in-class hospital or the most complaints for ACME with respect to wait time may be identified.

As another example, rules can be generated to automatically check for the values of certain factors in response to changes in reputation scores dependent on those factors. For example, as described above, a reputation dimension may impact a variety of reputation scores. For example, review volume is one aspect or dimension of an entity's reputation that can impact both the entity's sentiment and visibility scores. In some embodiments, rules are created that establish a mapping or relationship between dimensions and the scores they impact. These rules may be used to create predefined conditions that check for those reputation dimensions/factors in response to changes in scoring behavior (e.g., drops in one or more reputation scores). For example, if a drop in sentiment score occurs, a rule is triggered (where a threshold amount of drop is an example of a predefined condition for triggering evaluation of the rule) that checks or otherwise evaluates the review volume to see if the review volume is lower than expected (e.g., according to the normalized per-location/entity impact analysis described above). If the review volume is lower than expected, then an insight or reason is determined into why the sentiment drop has occurred (i.e., due to low review volume). This insight into review volume as the cause of the observed sentiment drop may then be presented.

The impact analysis described herein is an improvement over existing systems that typically surface information about reviews based on frequency and the number of times that words appear across reviews (that is, only looking for keywords and phrases or groups of words that appear disproportionately in a set of reviews), without consideration or regard for what those words mean to the reputation of an entity. Instead, using the techniques described herein, those categories or terms that have a disproportionate impact (rather than just frequency in reviews, as with existing systems) on reputation, that drive, for example, sentiment, are identified. Further, the use of industry-level data in the techniques described herein provides other improvements to existing systems, where, for example, some existing systems use rules to detect all complaints of any type (e.g., based on keyword searches), regardless of whether what is complained about has any impact on reputation. In the above example involving ACME, if industry-level data were not evaluated, and only ACME's feedback data were analyzed, then ACME might only focus on whatever types of complaints were discussed the most frequently (even though, unbeknownst to ACME, those complaints did not actually have an impact on ACME's reputation). However, by evaluating industry-level data across multiple entities or locations, as described herein, the relative impacts of different categories may be determined, allowing for benchmarks to be built to determine what reviewers are saying in their reviews about ACME versus other hospitals in the industry, in which case, it might be determined that those complaints are a general issue across all hospitals, and that ACME is in fact not weak in that category with respect to other hospitals. In fact, another category is a larger differentiator for ACME.

Thus, tickets would not be generated, for example, for areas that, while having negative reputation impacts, would not be beneficial for ACME to address (because they are not actually weaknesses of ACME's, relative to the benchmark).

Further, by prioritizing reputation factors based on impact (or gaps in impact), tickets can be generated for factors that have the largest effect on reputation, and not just those factors which have changed. The impact analysis can be used to determine whether a change in a factor actually has an impact on reputation. If not, then a ticket need not be generated simply because it changed. This is more efficient than simply generating tickets anytime a value for a factor changes.

The strength/weakness determination processing described above may be re-run on a time driven basis (e.g., daily, weekly, etc.) or on demand triggered by a particular volume of new feedback, as new feedback items are collected for analysis. What categories or aspects are designated as weaknesses may change over time. For example, if ACME addresses those categories that were identified as weaknesses, those weaknesses could become strengths. By re-performing the impact analysis periodically, the platform is able to determine what categories are weaknesses, without requiring a user to explicitly tell the platform what categories should be targeted. Rather, the platform automatically discovers problematic areas or areas of improvement for the entity, and generates actionable insights that allow the users of the entity to take proactive, focused steps that actually improve their reputation score or mitigate negative impacts to their online reputation.

Thus, as described above, the determination and designation of what reputation factors or components are strengths or weaknesses is used to drive further processing performed by the platform. As another example, as described above, for categories that are determined to be weaknesses, real-time rules, such as those described above, may be automatically generated or created to tag any feedback items that include the category to be flagged as having a weakness. This allows a collected feedback item to be passed to the appropriate queue for processing. As described above, the strength/weakness determination processing may be re-run regularly, to account for the changes in factors/dimensions changing from weaknesses to strength, or vice versa, with tagging rules automatically generated as appropriate.

Further details regarding impact analysis and strength/weakness determination are described below.

Virality Cause Determination

In the above examples of strength/weakness determination, the impact analysis was used to identify the reasons behind why a reputation score had dropped. The virality cause determination described below allows proactive identification of areas to address or manage in order to prevent the risk of future (negative) spikes or changes in reputation scoring.

In some embodiments, virality cause determination includes determining reputation factors (e.g., categories or key words) that are signals or precursors that predict large and sudden deltas in reputation scores (i.e., high velocity changes in reputation scoring). The virality analysis described herein may be used to determine a predictive impact on score of the presence of certain signals.

Virality cause determination engine 228 is configured to identify, from an evaluation of collected feedback data, signals that are indicative of anomalous reputation events, such as a rise or drop in a reputation score.

As one example, suppose that the virality cause determination engine is used to perform risk management to determine signals that are indicative of a risk of a drop in reputation score. In this example, the signals identified by the virality cause determination engine as being indicative of risk (of a drop in reputation) are those signals that are determined to be disproportionately associated with the anomalous reputation event. This includes, for example, those signals that are determined to appear with a high frequency around the time of (e.g., just preceding) instances of the anomalous reputation event, but otherwise appear with a low frequency.

In order to identify those signals that are disproportionately associated with the anomalous reputation event, the virality cause determination engine first determines all patterns that are potentially associated with the anomalous reputation event.

Determining the set of all candidate patterns that are potentially associated with the anomalous reputation event includes identifying the patterns/signals that are associated with feedback data that preceded instances of the anomalous reputation event. For example, the virality cause determination engine is configured to access and obtain historical feedback data for an industry. The virality cause determination engine performs an evaluation of the feedback data to determine what subset of the historical feedback data preceded instances of the anomalous reputation event, where anomalous reputation events may be defined in a variety of manners (e.g., sentiment score drops of a threshold amount within a threshold period of time, review volume drops, etc.). The subset of the historical feedback data that preceded instances of the anomalous reputation event is placed in a bucket, also referred to herein as a "risk" bucket. Virality cause determination engine 228 is then configured to identify patterns associated with the feedback data that has been placed in the "risk" bucket. Those identified patterns are the set of all candidate potential risk signals/indicators associated with the feedback data in the "risk" bucket.

In order to determine which subset of the candidate set of patterns is disproportionately associated with the anomalous reputation event (and are thus signals for risk of the anomalous reputation event occurring in the future), the virality cause determination engine determines, for each signal in the candidate set of signals/patterns, a comparison of the frequency with which that candidate signal appeared in feedback data in the "risk" bucket versus the frequency with which the candidate signal appeared in feedback data that did not precede instances of the anomalous reputation event. That set of feedback data that is determined to not have preceded instances of the anomalous reputation event is referred to as a "baseline" bucket of feedback data. As one example, the feedback data in the "baseline" bucket is all other feedback data in the historical feedback that was not placed in the "risk" bucket. In some embodiments, the virality cause determination engine is configured to define the conditions in which it is determined whether to include a feedback item (e.g., in a corpus or set of feedback items) in the "risk" bucket or the "baseline" bucket. The conditions may be based on the type of the anomalous reputation event for which it is desired to be prevented.

If, based on the frequency comparison, the candidate signal is determined to be disproportionately associated with the anomalous reputation event (e.g., the candidate signal frequently precedes instances of sentiment drops, but rarely appears when there are not sentiment drops), then the candidate signal is designated as a risk signal, where the appearance of the risk signal in feedback data predicts the future occurrence of an instance of the anomalous reputation event.

Thus, based on the virality cause determination/risk management processing, characteristics of collected feedback data that are precursors of anomalous reputation events are deterministically identified. This is an improvement to prior systems, where users manually define what they believe might be risk factors to watch out for or observe.

Various types of actions may then be taken based on the determination of risk signals. Further examples and details regarding virality/risk determination are described below.

Output Engine

The results of the reputation scoring and insights may be provided to users such as Bob and Alice. Output engine 230 is configured to provide output based on the processing performed by reputation platform 102.

Querying Engine

Querying engine 232 is configured to allow users of platform 102 to interact with the platform. In some embodiments, the query engine includes a user interface (UI) portion and an application programming interface (API), such as a REST (Representational state transfer) API. Users of platform 102 may use the UI or API to perform query requests to better understand or manage their online reputation. In one embodiment, a load balancer (e.g., Nginx) is used to handle requests in a load balanced manner (e.g., so that one user does not suffer slow query performance due to another user querying the platform excessively). In some embodiments, user authentication is performed before allowing queries to be made. In some embodiments, the queries are made via front end 252 (which communicates with platform 102 through firewall 248).

In response to a query (via the UI or the API), the query engine then retrieves information, for example, from database 216 to satisfy the request. As one example of a query, a user associated with ACME can request, e.g., via the browser user interface, to see all of its reviews. The UI layer receives the request, which is processed through the load balancer, and once the ACME user is authenticated, the query engine retrieves the relevant feedback data from the database.

The UI presented by the querying engine may be used to provide various types of interfaces, such as configuration interfaces, interfaces for reporting reputation information (e.g., summaries of analysis performed by the platform), interfaces for consuming data, interfaces for responding to feedback (such as reviews and surveys), interfaces for running various services and applications (as will be described in further detail below), etc.

The API may be used to provide data to the UI. The API may also be used to provide data throughout platform 102 (e.g., to engines that need feedback data in the database, or the results of the processing performed on the feedback data). For example, the API can be used to push information on which alerts are to be transmitted. Further details regarding alerting are described below.

The API may also be used to deliver reputation data to a platform or system external to platform 102. For example, ACME may also use a business intelligence platform or customer relationship management platform that is external to the reputation platform. Those external platforms may use the API to extract data from reputation platform 102.

Reporting Engine

In some embodiments, reporting engine 234 is configured to provide reputation reports. Various types of information may be reported by the reporting engine.

As one example, results of the reputation scoring described above may be presented to users. For example, reputation scores generated for an entity may be presented via the reports. As described above, for multi-location entities, scores may be broken down on a per-location basis. Further, for a multi-location entity, the top locations and bottom locations (by individual location reputation scores) may be presented. As yet another example, the factors that have the largest contribution (e.g., positive or negative—i.e., strength or weakness) on reputation scoring, as determined by the impact analysis engine, as described above, may be presented. This allows a user to understand what individual components or factors are having the largest impact in helping or hurting the entity's reputation score. As another example, benchmarking (by reputation scores) may also be presented in a report, allowing an entity to see how their reputation scoring compares against their competitors or other locations in a multi-location scenario.

In some embodiments, the reports include visualizations of scoring. As one example, consider the above-described review sentiment score. The review sentiment score may be presented visually in a report, for example, as a gauge or a thermometer, where depending on the reputation score, the thermometer indicates whether the aggregate sentiment is positive, negative, or neutral. A level of the thermometer corresponds to the reputation score. For example, a high reputation score may show a highly filled thermometer, while a low reputation score may show a thermometer that is filled low. The thermometer may further be color coded based on the scoring (e.g., green for a high sentiment score exceeding a threshold, red for a low sentiment score below a threshold, and orange or yellow for a neutral sentiment score between the high/low threshold scores). For example, the green coding may be for the best performers in an industry (e.g., in the 99$^{th}$ percentile of hospitals in the hospital industry).

Reports based on the insights determined above may also be presented. Further examples and details of such insights are described in further detail below.

Alerts Engine

Alerts engine 236 is configured to send or transmit alerts or notifications based on processing performed by reputation platform 102. These include notifications that are submitted in real-time (e.g., based on the real-time processing performed as feedback data is ingested, as described above), as well as notifications and alerts that are fired on a non-real-time basis (e.g., based on offline backend processing). For example, notifications may be sent to users at the end of the day (e.g., to provide a daily digest of reviews that had come in for the entity that day). Examples of alerts include data quality alerts, anomaly alerts, etc.

The alerts can be combined with other types of information (such as data from external systems that is integrated using integrator 206, as described above) to further trigger additional reputation processing. As one example, anomaly alerts can be triggered or detected by reputation platform 102 based on data from an external customer relationship management (CRM) system. As one example, feedback request deduplication may be performed based on the integration of data from external systems. For example, suppose that a person had gone to an AutoBest dealership to purchase a car on Thursday of last week. The person then also came back to the dealership on Saturday because they were having an issue. Suppose that there is a rule that has been defined that instructs the reputation platform (e.g., using feedback request engine 244, described in further detail below) to send out a survey request each time a person visits the dealership. However, in this case, because of the closeness of the visits by the user (e.g., because the transactions occurred within a threshold amount of time, or a review request had already been previously sent inside a threshold amount of time), the person should only be sent one survey or review request (instead of sending two back to back in a short time frame, which could be bothersome to the person). For example, a rule can be implemented to check that if the same user (based on a user identifier such as an email address, phone number, etc.) visits the dealership multiple times within a particular period of time (e.g., determined based on an evaluation of CRM transaction data), then an anomaly is detected, and an alert is sent to override the sending of additional review requests after the close-in-time second visit. If any duplicative or redundant survey requests had already been created, they may be deduplicated using the aforementioned processing.

Applications/Services

The results of the processing performed by the backend processing engine may be used by various services and/or applications (238) hosted or otherwise provided by platform 102 to users of the platform to understand the feedback that is being received. In various embodiments, the applications provide manifestations of the various types of feedback objects described above. For example, applications pertaining to reviews, surveys, directories, requests, business listings, social, CX manager, Google seller ratings, etc. may be hosted and provided by platform 102. As one example, the application provides a user interface (UI) (accessible e.g., by a browser) that surfaces information about the corresponding type of feedback item and also allows users to further explore and delve into analysis of those feedback items, such as reputation scoring, insights, and virality cause determination.

As one example, a browser-based UI may be presented, where different tabs for different types of feedback are presented. A user may select a tab to further explore information related to a type of feedback. For example, consider a UI for viewing information pertaining to reviews. Determined insights can be used to enhance the information about reviews by indicating how non-response to reviews drives down the overall reputation score for the entity (e.g., based on the impact analysis described above). Comparisons between different entities (e.g., based on the benchmark analysis described above) may also be surfaced. Recommended actions to take with respect to reviews based on the insights and impact analysis may also be presented. For example, suppose that platform 102 determines, based on the impact analysis described above, that the three reputation attributes or dimensions that are the biggest weaknesses for the location (as determined based on the impact analysis described above) are that the entity is missing several data points, the entity's volume of reviews is below the industry expectation (e.g., determined based on the industry-wide baseline), and that the entity is missing 11 key listings (e.g., by determining listings' completeness). As the specific weaknesses of the entity have been identified that have the largest negative impact on reputation, suggestions may be provided to address those identified specific weaknesses. For example, since review volume is low, the platform recommends (e.g., via the UI) suggestions targeted towards improving review volume. For example, it can be determined that click-through rates on email rates are down, affecting review volume, and should be increased. As another example, performing SMS review requests to invite customers may be suggested to improve review volume, since it has been determined that SMS review requests tend to have higher click-through rates, leading to improved review volume. As another example, the use of a new sales template may be recommended.

Thus, using the techniques described herein, granular, actionable intelligence that is tailored to an entity (rather than general, one-size fits all approaches) can be provided to the entity to help them focus on areas that are determined to be actual weaknesses for them. For example, when comparing the impact of certain factors between the entity and a benchmark set of cohorts, it may be determined that a metric such as review volume is lower for one group versus another. However, while a general assumption might be made that having a higher review volume is better than having a lower review volume, based on an evaluation of observed data and the benchmarking using the techniques described herein, it may be determined that this is not always the case, or that the impact of the higher review volume may be small, and thus spending a great amount of effort to improve on review volume would only lead to minimal improvements in reputation score. Using the techniques described herein, the impact of changing different reputation dimensions on reputation scoring may be quantified, with such information presented to users. Thus, the user may be presented actionable intelligence that indicates the relative impact of addressing different reputation factors (e.g., how much impact improving review volume would have on improving reputation score, as compared to adding more listings on industry-specific directory websites). The quantification of impact on reputation score may also be used to prioritize what reputation areas the entity should address most urgently.

Ticketing Engine

The insights determined from the aforementioned impact analysis and virality cause determination may be used in an operational context to take actions on feedback items by generating tickets. Ticketing engine 240 is configured to generate such tickets. As one example, suppose that after re-running the impact analysis, it is determined that a reputation dimension is now a weakness (where it was not previously). A search of existing or previously collected negative feedback that had to do with the newly determined weakness may then be performed, and used to escalate or surface those pieces of negative feedback so that they can be addressed immediately.

Real-Time Ticketing Automation Rule Generating Engine

As described above, the insights generated offline may be used to perform real-time actions on collected feedback, as it is ingested by platform 102. For example, the collected feedback is tagged, where the tagging then determines what action queues the feedback is placed in for real-time workflows.

In some embodiments, real-time ticketing automation rule generating engine 242 is configured to automatically generate the rules used to tag incoming feedback. The ticketing automation rules may be generated, for example, based on insights determined by platform 102 (e.g., based on impact analysis and virality risk analysis described above). For example, a rule can be generated to tag a piece of feedback as having a weakness if it references or includes text about a topic or category that has been determined to be a weakness.

Feedback Request Engine

Feedback request engine 244 is configured to transmit requests for feedback to potential feedback providers. In various embodiments, this includes transmitting requests to fill out surveys, write reviews on one or more review sites, etc. Requests for feedback may be transmitted in a variety of manners, such as electronically (e.g., via email, SMS, etc.). In some embodiments, personalized requests are generated from a template.

In some embodiments, review requests are monitored by platform 102. For example, if a user responds to a review request (which may be determined in response to the potential reviewer clicking on a link in a review request email, where the link causes a callback to platform 102, which platform 102 detects as an indication that the user has accepted the review request) and writes a review to a review site (which may be monitored by platform 102), feedback collection engine 202 may then collect the new review from the review source site, as described above.

Survey Request and Collection Engine

In contrast to the above example regarding review requests, where authored reviews are posted to source sites external to platform 102, in some embodiments, surveys may be returned (in response to survey requests) directly to platform 102 (and thereby collected via a different path than via feedback collection engine 202). Survey request and collection engine 246 is configured to send out survey requests and also bring back returned survey data into the reputation platform. As one example, the survey request and collection engine sends an email survey request that includes a link/email address. The filled out or otherwise responded-to survey is directly provided back to the platform via the survey request and collection engine (e.g., rather than by scraping a source site or using an API, as described above).

An embodiment of a reputation platform has been described above. In some embodiments, the reputation platform is implemented on a service or infrastructure such as an Amazon Web Services (AWS) virtual private cloud. In some embodiments, the entity operating the reputation platform in the cloud may also have its own local, internal network. In some embodiments, firewalls (e.g., firewall 248) are implemented to allow, for example, data to be communicated between the internal network (e.g., internal network 250) and the cloud-based platform (where firewall 248 is used to protect any communications with platform 102 over a network such as the Internet). This allows, for example, developers to push code, perform research and modeling on data stored in the cloud, etc.

Further Details and Embodiments Regarding Virality Cause Determination

In this example, suppose that ACME Hospital has seen a competitor hospital suffer large negative backlash on social media caused by what appears to have been an incident having gone viral, thereby causing sudden damage to the competitor's reputation. ACME would like to understand what happened to the competitor, and more specifically, were there any signs that, if present in ACME's feedback data, would be predictive or otherwise indicative of a risk that ACME's reputation would likely drop precipitously in the near future, as it did for the competitor.

To determine risks for ACME, virality cause determination engine 228 is configured to perform an industry-wide evaluation. For example, for all US hospitals, platform 102 observes all reviews (or any other piece of feedback, as appropriate), and their time series of reviews (and any other associated information, as appropriate). For each hospital, platform 102 also calculates or determines, at any point in time, a sentiment score for the hospital (e.g., the average review rating over the last 12 months). Various other signals are also calculated, such as the amount that reviewers are mentioning different categories in those reviews, the relative sentiment on one source versus another (e.g., Facebook versus Google), the average sentiment on reviews versus surveys, the sentiment score for their nearest competitor, etc. This historical information calculated at various points in time for all the hospitals in the industry is used to generate a model to predict future sentiment scores. Other types of predictions may be performed (e.g., prediction of online traffic based on current traffic and current sentiment score).

Using the information calculated over all time for each of the hospitals, the virality cause determination engine is configured to determine the largest drops in the target metric (sentiment score in this example) at any point in time for any hospital, where the large drop is one example of an anomalous reputation event detected by the virality cause determination engine (where anomalous reputation events may be defined in a variety of ways). The virality cause determination engine is then configured to detect any patterns or signals that precede those largest drops.

The virality cause determination engine then determines for the signals that are detected in the subset of feedback data preceding the largest drops, whether those signals are disproportionately associated with the largest drops in sentiment score. This includes determining if there are signals that are commonly present in the feedback data just preceding drops in sentiment, but are observed rarely or infrequently in the remaining feedback data (e.g., the feedback that does not precede drops in sentiment score). Those signals that are determined to be disproportionately associated with large drops in sentiment score (or any other anomalies) are then designated as risks. Thus, in this example, the optimization problem being solved is, given receipt of a review that has a certain set of characteristics or patterns (e.g., keywords, categories, etc.), what is the impact on reputation score likely or predicted to be in the future (e.g., one month from that point in time). Actions are then taken based on the identified risks, such as prioritized responses.

As one example, suppose that the industry-wide feedback data includes 100 weeks of time series feedback data for each of the 100 US hospitals, where each week is a data point. This results in 10,000 data points. For each week in the 100 weeks for a hospital, the sentiment score for the hospital up to that week is computed (e.g., the average rating of all reviews for the previous 52 weeks). The sentiment score for the four weeks after or subsequent to the week is also computed (e.g., using the feedback data written and/or received during that subsequent period). Those weeks with the largest determined differences are selected. Looking forward a certain number of weeks allows for a determination of whether there was a sustained or dramatic drop in sentiment. Looking forward also allows the model to predict what the sentiment score will be in several weeks following reviews that include certain signals identified as risks. Those weeks (e.g., data points) that are identified as being instances of the anomalous reputation event may be the weeks with the top 1% or 0.1% week-over-week drops in sentiment score, or, as another example, may include any weeks where the sentiment score drop to the next week equaled or exceeded a threshold drop.

As another example, instead of computing the difference between the sentiment score for periods prior and subsequent to a certain week, as described above, the sentiment for the last year prior to each week is computed. The difference between the sentiment for one week versus the next is determined (i.e., the week-over-week change in sentiment is computed). The weeks where the sentiment score dropped the most from that week to the next week are identified (i.e., week-over-week changes are evaluated). This processing is performed for every one of the 100 weeks for the 100 hospitals. Those weeks (e.g., data points) that are identified may be the weeks with the top 1% or 0.1% week-over-week drops in sentiment score, or, as another example, may include any weeks where the sentiment score drop to the next week equaled or exceeded a threshold drop.

The feedback data from those identified weeks that had the largest computed before/after differences in sentiment score are placed into a first bucket, also referred to in this example as a "target" or "risk" bucket. The remaining historical feedback data is placed in a second bucket, also referred to in this example as a "baseline" bucket. The feedback data in the "risk" bucket is analyzed to identify signals that may be indicators of risk (e.g., because there may be some characteristics of the reviews in those weeks that preceded sentiment score drops that caused much more negative feedback about a hospital than everything that happened before). For example, given the signals detected in the risk bucket of feedback data preceding anomalous drops in sentiment score, the virality cause determination engine determines what signals in those buckets tend to be disproportionately associated with this type of anomaly. In various embodiments, signals include specific keywords that appear in reviews with negative sentiments, specific keywords that appear across multiple locations in a short (threshold) amount of time, specific key topics, specific keyword groups, categories, a sudden uptick in negative review volume across multiple locations and regions simultaneously, a sudden uptick in negative volume on specific sites or specific sets of sites simultaneously, certain behavior on competitive sites, new topics associated with negative sentiments that have not been previously mentioned for the hospital or other hospitals, characteristics of the author of the review, the source that the review was on, etc. For any detected anomalous drops in sentiment score at any point in time for any hospital in the industry-wide group, the same signal detection processing is performed in the feedback data of the hospital preceding the detected anomalous drops.

Thus, based on the above processing, the historical, industry-wide feedback data across the 100 US hospitals has been partitioned into two buckets. The risk bucket includes the subset of feedback data that was in the weeks that preceded large drops in sentiment score. For example, the feedback data for the 500 weeks out of the 10,000 total data point weeks that had the largest drop in sentiment score between the previous 52 weeks and the subsequent 4 weeks is placed in the first bucket. The second, baseline bucket includes the remaining feedback data (e.g., that did not precede large drops in sentiment score that are defined as detected anomalous conditions). As shown in this example, the bucketing of the feedback data is based on whether or not it precedes the condition being detected for (in this case, large drops in the reputation score). Signals that are disproportionately associated with large drops in sentiment score include those that are present with high frequency or rate or count in the risk bucket, but are rarely present in the baseline bucket (e.g., the ratio of the frequencies of the signal in the two buckets skews much higher towards the first bucket, rather than the signal appearing at all times). Alternatively, signals that appear disproportionately less in the risk bucket versus the baseline bucket may also be flagged. That is, for example, there is a change in the rate of the appearance of the signal between the two buckets (where the second bucket may be considered as a form of baseline).

For example, if there were 100,000 total reviews that were evaluated, with 1,000 reviews in the 500 weeks (that preceded large drops in sentiment score, as described in the example above) falling in the first bucket, and the remaining 99,000 reviews in the second bucket, the virality cause determination engine determines what signals disproportionately appeared in the thousand reviews in the first bucket versus the other 99,000 reviews in the second bucket. As one example, the virality cause determination engine takes every word mentioned in any of the 1,000 reviews in the risk bucket, and counts the number of times they occur. The virality cause determination engine then counts the number of times those same words appear in reviews in the baseline bucket. The virality cause determination engine then compares the counts for each word to determine a ratio. The following is an example table of results.

TABLE 1

| Word | Risk Bucket Count | Baseline Bucket Count | Ratio |
|---|---|---|---|
| "Norovirus" | 10 | 2 | 5 |
| "Bone" | 5 | 5,000 | 0.001 |
| "Cashier" | 300 | 1,000,000 | 0.0003 |

In another embodiment, rather than comparing the count of a word in the risk and baseline buckets, the frequency of the words in reviews (e.g., average number of times a word appears in a review) is computed for the words in the risk bucket. The frequency of the same words in the reviews of the baseline bucket is also computed. A comparison of the frequencies is performed to determine, for example, a ratio of frequency for each word (other comparisons, such as differences, may be computed). In some embodiments, a ratio of counts is used. A measure such as the ratio of the frequency of appearance of a word per feedback item may also be used to determine the disproportionate presence of a signal (e.g., by taking the count of the word and dividing it by the number of reviews in the risk/baseline bucket, and then comparing those ratios).

Based on the comparison, it is determined whether words are risks or not. For example, if a word appears disproportionately in the risk group compared to the baseline group (e.g., according to a threshold), then the word is designated as a signal of risk that predicts a large drop in sentiment score if present in a review.

Thus, as shown in this example, the virality cause determination engine determines what is in the reviews in the risk bucket that is fundamentally different from the review data set in the baseline data set/bucket. Those signals are then identified or designated as risks that tend to precede scores dropping significantly (e.g., they have a risk of becoming viral and causing large negative outcomes). However, if a signal is present in both buckets in expected proportions, then that signal is not determined to be a risk because it does not disproportionately precede anomalous events (versus other times in which the anomalous event has not been detected). For example, suppose that the term "norovirus" is detected in the first bucket of feedback data, when sentiment scores dropped significantly. However, it is determined that "norovirus" was also detected with a similar frequency even when sentiment scores did not drop significantly. In this case, the mere presence of the term "norovirus" by itself is not identified as a risk term. On the other hand, the appearance of "norovirus" three times on the same day in three different locations in three different states may be a different signal that is identified as a risk based on the processing described above. Thus signals/patterns may be combinations or sets of various attributes with various characteristics that further depend on temporal and geographic (e.g., across location) information While a granularity of a week is used in the above example, any other time granularity (e.g., month, day, hour, etc.) may be used, as appropriate. In some embodiments, the time frame or granularity is dynamically adjustable, for example, based on frequency of reviews. As another example, points in time may be defined as a time when any review or piece of feedback was received. As another example, the system may model and evaluate multiple time periods at once determining the optimal time windows to consider for different types of risk. For example, the virality cause determination engine observes each and every time a single review is received for a hospital, and determines what the sentiment score (e.g., average online rating) was before the hospital received the review, and what the sentiment score was after the review (e.g., one week later). While any one review is unlikely to have a large impact on sentiment score, the virality cause determination engine is able to determine whether that review precedes sentiment drops, or otherwise predicts what will happen after seeing such a review (e.g., if there will be a large sentiment drop). Those reviews that do precede the drops can be aggregated into a risk bucket, while other reviews are bucketed into a baseline bucket, and the frequency of the signals present in those reviews in the risk bucket group can be compared against the frequency of the same signals in the reviews in the baseline bucket to determine whether any of the signals are risks. In some embodiments, the determined future impact on reputation score based on the presence of such a signal is also determined. For example, the expected future impact on reputation score of the presence of a signal may be determined as the average drop in score observed before and after feedback data including the signal was observed.

By evaluating the feedback data preceding the anomalous drops, potential risks can be identified before drops in sentiment actually occur. For example, specific reviews which contain risks may be escalated for responding to immediately, or to be surfaced immediately. As another example, rules may be automatically generated to create tickets to take an action on feedback items that contain signals identified as risks.

For example, suppose that based on the modeling, it is determined that when the categories "wait time" and "scam" appear together in two reviews within a week for a particular location (example of a signal or pattern, which in other embodiments, may include other factors such as keywords, etc.), then the reputation sentiment score is predicted to decrease by half a star in the next six months (that is, the above risk analysis has determined that such a relationship exists between that signal and sentiment score). Thus, when such a signal is detected, it is immediately flagged and escalated (e.g., via an alert or notification), so that the risk can be addressed immediately after the second review has been received (upon which the signal condition was met), and not after 500 reviews have already been received (i.e., the risk signal has gone viral). While the one or two reviews on their own might not have a large impact themselves on the overall sentiment score, the signal determined across the two reviews has been determined to precede a large drop in sentiment (or that a large drop in sentiment will likely occur after seeing the signal in those reviews). This allows for prioritized response to high risk reviews. Thus, ACME can be notified in real-time of any risks that should be immediately addressed in order to prevent the occurrence of dramatic reputation damage in the near term (that may potentially be fatal to a business).

As described above, using the virality cause determination techniques described herein, reputation data is collectively analyzed to predict where an entity's reputation is going towards (e.g., predicting where the reputation score is trending given the current state of their feedback data). In the above example, feedback data for a specific industry was used to generate the predictive model. In some embodiments, the results of the reputation prediction processing performed for one industry may be used to bootstrap the generating of a predictive model for another industry. For example, the patterns that signal that drops in reputation score are likely to occur that were determined in the hospital industry may also be used as training data for other industries for which there is little, if any, feedback data available for analysis. For example, signals related to the food category in hospitals may be applied to other industries that have food components, such as hotels.

In some embodiments, the results of the virality cause determination processing described above may be used to identify new categories or topics. For example, for patterns that are identified that are words (or combinations of words), if those words are not associated with a previously defined category, this may indicate that there is a new topic or category present in the feedback data. This allows for a new category to be discovered. The newly discovered category can then be added to a list of previously identified categories that are checked for in feedback data.

While in the above example, signals or patterns that tend to precede negative outcomes (e.g., such as fast and severe drops in sentiment scores) are identified as risks and surfaced to allow proactive resolution before the negative outcome actually occurs, the virality cause determination techniques described above may be variously adapted to support the occurrence of other anomalous reputation events, which may have, for example, positive outcomes. For example, signals that tend to precede or predict or are otherwise indicative of future increases in sentiment score are identified. Those signals may then be surfaced to ACME to allow them to proactively take action to improve their score. For example, certain pieces of feedback such as reviews or social media posts or user generated content may be selectively promoted if they include signals or patterns that are disproportionately associated with positive increases in reputation score, and have the possibility of going viral and having a positive impact on reputation. The virality cause determination techniques described above may also be variously adapted to support the occurrence of any reputation event, such as a change in review volume. This includes evaluating a set of historical feedback items. It is determined if a feedback item in the set preceded (e.g., within some previous period) an instance of a reputation event of interest. If it did, then it is placed in a first partition of feedback items, where the set of feedback items in the first partition potentially has some characteristic or set of characteristics (in, among, or across feedback items in the partition) that indicate or signal the occurrence of an instance of the reputation event. If not, then the feedback item is bucketed into a baseline partition of feedback items. The set of feedback items in the first partition are evaluated to determine a set of characteristics of/patterns in the first partition of feedback items. These are candidate patterns that might signal or predict the occurrence of the reputation event. It is then determined whether a candidate pattern in the set of candidate patterns is disproportionately associated with the first partition relative to the baseline partition (e.g., appears much or much less as compared to the baseline partition).

As another example, the above analysis can be used to determine signals for any types of changes or anomalous events in reputation measures, as appropriate. For example, historical reviews may be evaluated to determine signals that precede or predict a significant reduction in volumes of feedback. For example, it may be determined, without prior knowledge, that the presence of words such as "closed" are indicative of the review volume going to zero, where such words do not tend to be used when review volume does not drop significantly.

Figure 3:
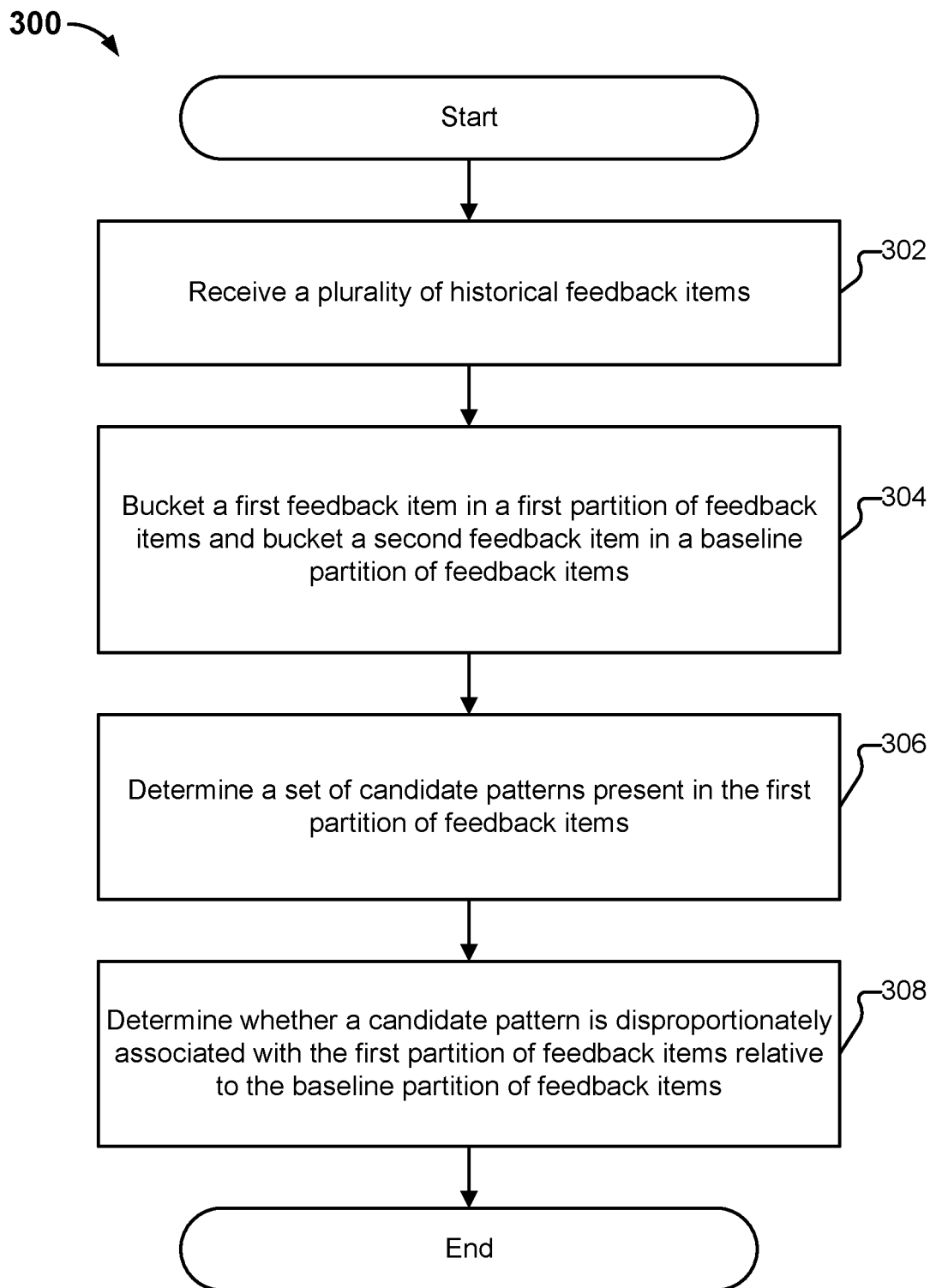
FIG. 3 is a flow diagram illustrating an embodiment of a process for identifying patterns that signal a risk of anomalous reputation events.

FIG. 3 is a flow diagram illustrating an embodiment of a process for virality cause determination. In some embodiments, process 300 is executed by virality cause engine 228 of platform 102. The process begins at 302 when a plurality of historical feedback items is received. In some embodiments, the plurality of historical feedback items includes industry-wide feedback items.

At 304, a first feedback item in the plurality of historical feedback items is bucketed into a first (e.g., anomalous) partition of feedback items. The feedback items in the first partition potentially include indicators that signal an occurrence of a reputation event (e.g., rise or drop in a reputation score or metric, or a change in a set of reputation attributes that meets a set of criteria for qualifying as an anomaly or event of interest). A second feedback item in the plurality of historical feedback items is bucketed into a second, baseline partition of feedback items. The first feedback item is bucketed into the first partition of feedback items based on a determination that the first feedback item preceded an instance of an anomalous reputation event. The second feedback item is bucketed into the baseline partition of feedback items based on a determination that the second feedback item did not precede an instance of the anomalous reputation event.

At 306, a set of candidate patterns present in the first partition of feedback items is determined. A candidate pattern includes a set of characteristics of the feedback items in the first partition of feedback items.

At 308, it is determined whether a candidate pattern in the set of candidate patterns is disproportionately associated with the first partition of feedback items relative to the baseline partition of feedback items. Determining whether the candidate pattern is disproportionately associated with the partition of feedback items relative to the baseline partition of feedback items includes determining a measure indicating an amount of occurrence of the candidate pattern in the first set/partition of feedback items. It also includes determining a measure indicating an amount of occurrence of the candidate pattern in the baseline partition of feedback items. In various embodiments, a measure indicating the amount of occurrence of the candidate pattern in the first or baseline partition of feedback items includes a count, a frequency (e.g., count of occurrence divided by number of feedback items in the first/baseline set of feedback items), etc. The measure of the amount of occurrence of the candidate pattern in the first partition of feedback items is compared to the measure of the amount of occurrence of the candidate pattern in the baseline partition of feedback items. For example, the ratio of the respective measures is determined. The candidate pattern is determined to be disproportionately associated with the first partition of feedback items based on the comparison (e.g., the ratio of the measures exceeds a threshold).

A candidate pattern that is determined to be disproportionately associated with the first partition of feedback items is then designated or identified as a pattern that signals the future or subsequent occurrence of an instance of the anomalous reputation event.

Various processing may then be performed based on the identification of a pattern that signals the subsequent occurrence of an instance of the anomalous reputation event. For example, the future occurrence of the anomalous reputation event for a specific entity may be predicted or otherwise determined by identifying the pattern/signal in the feedback items for the specific entity. When the signal is identified, an alert or notification may be sent to a user associated with the specific entity, so that proactive measures may be taken to address the signal before the occurrence of the instance of the anomalous reputation event (which is predicted to occur if no action is taken).

Further Details and Embodiments Regarding Strength and Weakness Determination

Now suppose that after intercepting signals of anomalous reputation events such as the risk of a drop in reputation score, and mitigating their negative impact on reputation scoring, ACME is now in a steady state. ACME may now use platform 102 to identify opportunities to improve its reputation over the long term, for example, using the impact-based strength/weakness analysis described above. The following is an example illustrating the impact-based strength/weakness analysis.

In this example, what categories or topics are weaknesses or strengths of ACME relative to overall sentiment is determined. The categories may be predefined. In this example, platform 102 has previously identified K categories that are relevant to the hospital industry (e.g., food, doctor competence, wait times, etc.).

In this example, first, baseline category impacts on overall sentiment are determined. This includes determining how categories impact overall ratings for reviews (or how they impact the overall sentiment of authors of the feedback). One example is how good, bad, or neutral experiences explicitly impact overall sentiment for people. This includes obtaining feedback data for every hospital for which feedback data has been collected (and stored in database 216).

Each piece of feedback in the industry-wide set of feedback is evaluated. This includes normalizing the overall sentiment or overall rating that accompanies the piece of feedback. For example, different review sites use different ratings scales. On some review sites, a rating of 1 star to 5 stars is used. Another site may use a scale of 1-10 for rating a review. Yet another site may only offer two options, "recommend" or "not recommend." In this example, the overall ratings or sentiments accompanying feedback items are all normalized to a common scale, such as a 1-5 star or point rating, where 1 reflects the lowest score (and most negative sentiment), and 5 represents the highest score (and most positive sentiment). For example, for review sites that have a scale of 1-5 stars, then the number of stars corresponds to the normalized score. For the site that only allows the option of "recommend" or "don't recommend," "don't recommend" is normalized to an overall rating of 1, while "recommend" is normalized to an overall rating of 5.

In one embodiment, after the rating normalization is performed, an optimization problem (e.g., machine learning problem) is solved to determine how categories impact overall rating for people—for example, how "good," "bad," or "neutral" experiences explicitly impact overall sentiment for specific feedback providers. As one example of solving a machine learning problem, a regression is performed to determine the relative expected impact for any category. For example, all of the feedback is evaluated to determine, for each category, the impact of positive sentiment for the category on the overall rating, the impact of neutral sentiment for the category on overall rating, the impact of negative sentiment for the category on overall rating, and the impact on overall rating of a category that is not applicable (e.g., the category is not observed in the feedback item, or there is no discernable sentiment related to it).

The following is one example of performing such a regression. In this example, the regression attempts to model the relationship between the sentiment of categories expressed in a review and an overall rating of a review. The industry-wide baseline model is generated by using the observed overall ratings for actual reviews, which are analyzed to determine what categories are present in the reviews, and what the observed local sentiment for each category in the review was. In this example, all feedback data in an industry (or similar industry) is grouped together to solve the problem.

In this example, each category may have a sentiment of positive, neutral, negative, or not present/applicable, as described above. Each of these sentiments may be assigned a corresponding value. Various models may then be used to model overall review ratings. As one example, in a symmetric model, positive sentiment could be given a value of 1, neutral sentiment a value of 0, negative sentiment a value of −1, and not present a value of N/A.

Based on the industry-wide regression, the following symmetric model is generated:

$$\text{overall review rating} = w_1 \text{Sentiment}_{c1} + w_2 \text{Sentiment}_{c2} + \ldots + w_K \text{Sentiment}_{cK} + \text{baseline} + \text{residual}$$

That is, the model predicts an overall rating for a review (between 1 and 5 in this example) as a function of the expressed sentiments for categories in the review.

For example, suppose that there are only three predefined categories, food, doctor competence, and wait time. One example of the model generated by the regression analysis is the following:

$$\text{predicted overall review rating} = 0.2 * \text{Sentiment}_{Food} + 0.4 * \text{Sentiment}_{DoctorCompetence} + 0.3 * \text{Sentiment}_{waittime} + 4$$

By solving the machine learning problem (e.g., by performing the regression analysis on industry-wide feedback data to determine a model for predicting or determining an expected overall sentiment as a function of category sentiment), platform 102 determines for each category, the impact on overall rating of each of the possible sentiments for the given category (where the model is symmetric, as the magnitude of the impact of positive/negative sentiment is the same, but the signs are different).

Other types or versions of models, such as asymmetric models may also be generated. In this example, each type of sentiment for a category is considered a separate factor/component in the model, where if a sentiment for the category is observed, it is given a value of 1 (or 0 otherwise). A weight of the factor may then indicate what the impact is. The following is an example of such a model:

$$\text{predicted overall review rating} = 0.3 * \text{positve}_{sentiment_{Food}} - 0.1 * \text{neutral}_{sentiment_{food}} - 0.2 * \text{negative}_{sentiment_{food}} + 1.0 * \text{positive}_{sentiment_{DoctorCompetence}} - 0.2 * \text{positive}_{sentiment_{DoctorCompetence}} - 1.8 * \text{negative\_sentiment}_{DoctorCompetence} + 4$$

The following is an example of the output generated as a result of the asymmetric modeling described above.

TABLE 2

| Category | Expected Rating Impact of Positive Sentiment | Expected Rating Impact of Neutral Sentiment | Expected Rating Impact of Negative Sentiment | Expected Rating Impact of Not Present |
|---|---|---|---|---|
| Food | +0.3 | −0.1 | −0.2 | 0 |
| Doctor Competence | +1.0 | −0.2 | −1.8 | 0 |

As shown in the above example, based on an analysis of the feedback data, it is determined that for the category of food, if sentiment for food is positive, this has an expected impact of +0.3 on the overall rating, if food is neutral, it is −0.1, and if the food is negative, it is −0.2. For another category, doctor competence, if it is positive, it is +1, if it is neutral, it is −0.2, and if it is negative, it is −1.8. In some embodiments, if a category is not mentioned in a review, its impact on overall sentiment of a review is assumed or expected to be zero.

In this example, platform 102 also determines, for each sentiment for each category, a frequency (or count or any other appropriate measure) of the occurrence of a given sentiment for a given category (e.g., positive sentiment for food was expressed in X number of reviews, and/or in Y % of reviews).

In some embodiments, an expected starting or baseline rating for an average or typical review (e.g., if a reviewer does not talk about any of the categories or does not leave any feedback) is determined based on the determined model of the overall sentiment. As one example, if a regression is performed, the intercept of the model is used as the baseline or expected starting rating. In this example, suppose that the intercept is 4, and thus, the baseline starting rating is expected to be 4 (e.g., out of 5).

While in the above example, a linear regression was performed, other types of machine learning techniques such as decision trees may be used. Other examples of machine learning techniques that may be used include generalized regression, boosted trees, random forests, Bayesian approaches, etc.

In some embodiments, upon determining the industry baseline model, for each category, it is determined what the spread is between the impact of positive sentiment versus negative sentiment for a category. If the delta impact between positive and negative sentiment exceeds a threshold, this is used as an indication that there may be multiple sub-types of categories. For example, suppose that based on the impact analysis, it is determined that reactions to the category of doctor competence are fairly extreme. When people are positive about doctor competence, this has a +1 impact on overall sentiment, but when people have a negative sentiment about doctor competence, this has a −2 impact on overall sentiment. The delta (−3 in this example) may be determined to be a large variance (e.g., by exceeding a variance threshold) in terms of how much impact doctor competence has on sentiment. This large variance in the category may be used as a signal to perform further analysis to determine if there are different types or different levels of doctor competence. For example, there may be a set of reviews that are negative on doctor competence and that are one star, while there is another set of reviews that are also negative on doctor competence, but do not go down to one star. This is an indication that there is a high likelihood that there are two different types of negative competence feedback. That is, it is determined whether the topic of doctor competence may be further bifurcated (into various types of doctor competence) by looking at, for example, both the specific subsets of text that reviewers are using within these reviews, as well as the specific ratings to identify outliers to generate different sets of reviews for comparison. For example, two sets are generated. One set includes those reviews where negative sentiment for doctor competence appeared to have a large impact in driving down sentiment, and then a second set of reviews where there was also negative sentiment for doctor competence, but the evident impact was small (e.g., overall sentiment was still positive). The text of the two sets may be used to determine what people are saying in the first group about doctor competence versus what people are saying in the second group about doctor competence to determine whether there are actually two different branches of categories of doctor competence. As one example, platform 102 may determine keywords and phrases that are very prevalent in the first group of feedback, but are not prevalent in the other set of feedback in order to explore what the difference is in between the two sets of feedback, and what categories are missing. This allows for the discovery or determination of new categories or sub-categories. Another example trigger for determining that a category should be further evaluated for additional categories is if the proportion of feedback that is about the category exceeds a threshold percentage or proportion of the overall amount of feedback. For example, if 50% of hospital reviews are about staff, then it is determined that staff is a large category, and that further sub-categories of staff should be determined.

After using industry-wide feedback data to determine the industry wide baseline (including the expected starting rating, as well as the expected impact on overall rating of sentiments for categories, for a typical review of the average hospital), suppose that ACME would like to understand what the impact that the sentiments for various categories expressed in ACME's own reviews have on driving the overall sentiment for ACME, specifically.

This includes evaluating each piece of feedback in the feedback data specific to ACME (e.g., the reviews written about ACME). In this example, the analysis of any specific review starts with the industry baseline. The baseline is used to determine the relative, expected impact if a reviewer is positive or negative or neutral about a specific part (e.g., category) of a specific type of feedback (e.g., of a review).

For example, suppose that a first review in ACME's reviews has the following characteristics: (1) Overall rating: 1 star; (2) negative sentiment for food; and (3) negative sentiment for doctor competence.

Based on the industry-wide baseline model determined above, the expected combined impact of negative sentiments for food and doctor competence is −2 (−0.2 for negative food and −1.8 for negative doctor competence), and thus, the expected rating based on the modeling, starting from the baseline rating of 4 determined above, is 2 (out of 5).

However, the overall rating for this specific review of ACME was 1. To explain this difference in rating, the expected category impacts are adjusted to determine how the category sentiments actually impacted this reviewer's overall sentiment for ACME specifically. For example, the expected category impacts are multiplied by the ratio of the gap between the industry expected baseline rating and the observed rating, and the gap between the industry expected baseline rating and the expected rating. In this example, this ratio is −3/−2=1.5.

For this review, the expected negative impacts of food and doctor competence (determined from the industry-wide model above) are scaled by 1.5, such that for this review of ACME, (1) negative sentiment of food had an impact of −0.2*1.5=−0.3, and (2) negative sentiment of doctor competence had an impact of −1.8*1.5=−2.7. The adjusted or normalized category sentiment impacts, when summed, equal −3, which explains why for this review, the rating was 1 (starting from an expected rating of 4). Thus, for the reviewer of the first review, negative sentiments for food and doctor competence are credited with a larger impact on the reviewer's overall rating for ACME, as compared to the expected impact.

For a second review, suppose that the overall rating was 2. The review contained a positive sentiment for food, but a negative sentiment for doctor competence. The expected impact on overall sentiment for the review is +0.3+−1.8=−1.5, resulting in an expected score of 4−1.5=2.5. However, the gap from the baseline rating of 4 was actually 2.

In this example, the expected sentiments are then scaled by 2/1.5, resulting, in this particular review, with an adjusted impact of positive sentiment for food of +0.3*2/1.5=0.4, and an adjusted impact of negative sentiment for doctor competence of −1.8*2/1.5=−2.4.

Thus, as shown in this example, based on the industry-wide model that was established using the regression analysis described above, it is predicted what a rating for a review would be given the sentiments expressed for categories in the review. However, a specific instance of a real review may deviate from the prediction made by the model. In the above examples, a normalization is performed in which the platform assumes that the reviewer, in providing their overall rating based on their expressed category sentiments, acted in a manner that is proportional to what is predicted by the model. In other embodiments, rather than performing proportional scaling, other types of normalizations may be performed. For example, platform 102 may assume that the reviewer's sentiments for categories in their review impacted the overall rating in the manner predicted by the model, where the difference in actual overall rating versus the expected rating is attributed to a separate "X-factor." That is, in the first review, negative sentiment for food had an impact of −0.2, and negative sentiment for doctor competence had an impact of −1.8, as predicted by the model, where the remaining drop in 1 star or point (to account for the drop from the baseline 4 points to the observed 1 point overall rating) is due to this X-factor or unexplained factor (such as brand value, etc.). The impact of this X-factor may then be aggregated across the reviews (e.g., as another category), in a manner similar to as described below.

In the above review, there were two categories that were discussed, and the contribution or impact of the sentiment for each of the two categories on the overall sentiment was determined. In some embodiments, if there is only one category, then that category is given all the credit for determining the difference between the expected starting rating and the actual observed overall rating for the review. For example, if a 3-star review only expressed a negative sentiment for food (and did not mention any other categories), then the gap of −1 stars (from the expected starting or baseline rating of 4 stars) is determined to be completely explained by the negative sentiment for food, and the adjusted impact of the negative sentiment for food for this particular review is −1 (versus scaling the expected impact as described above).

In some cases, the sentiments determined for categories in a review may not reconcile or track with the observed overall rating. For example, a review may only express negative sentiments for various categories, but still have an overall rating of 5. As another example, another review may only express positive sentiments, but still have the lowest overall rating of 1 (e.g., because a person did not know that 5 stars was good and one star was bad, and instead thought that one star was the highest rating). As another example, a review might be positive for food and negative for doctor competence, which, according to the industry-wide model, should yield a net negative impact on the baseline rating (where the rating is expected to be below 4), but the observed rating was 5. Performing the adjustment/normalization of the ratio of the ratings gaps would not explain the observed overall rating given the sentiments expressed for the categories. In some embodiments, such reviews are bucketed, where they may be either ignored or treated separately. For example, in the case where the review was positive on food and negative on doctor competence, but still results in 5 stars (a net positive over the expected baseline score), the platform may attribute the positive impact of 1 wholly to the positive sentiment for food, while doctor competence is assumed to have 0 impact for this reviewer. In some embodiments, such reviews are flagged, so that, for example, they may be further analyzed to improve impact analysis. As another example, for those reviews that express only positive sentiments, but have a low overall rating (e.g., because the reviewer had believed 1 star to be the best, and 5 stars to be the worst rating), a notification may be automatically sent to the reviewer asking them to amend their review and provide a new rating, given that the expressed sentiments do not align with the observed rating.

While examples involving the determination of impacts of reputation attributes such as categories have been described above for illustrative purposes, the techniques may be variously adapted to model the impacts of other types of reputation attributes/feedback characteristics as appropriate, such as multiple mentions of a category, overall volume of text in a review, how much non-categorized feedback is present, specific words or phrases that are associated with uncategorized text, the length of a review, degree of expressed sentiment, etc.

Each review in the set of ACME's reviews is evaluated as described above. In some embodiments, the platform records each time a certain sentiment for a category is observed in a feedback item. For example, the platform records the number of reviews in which negative sentiment for the food category was expressed, the number of reviews in which a positive sentiment for the category of doctor competence was expressed, etc., as well as aggregating and averaging positive and negative impact of each category The results of the analysis of each individual review of ACME are then aggregated. In this example, platform 102 then determines, for ACME, the average or aggregate impact of each category on overall sentiment.

For example, suppose that 1000 ACME reviews had been evaluated, using the renormalization of the industry-wide baseline as described above. For the food category, the following results were determined from the 1000 reviews:

(1) There were 100 reviews that contained a negative sentiment for food, and the average adjusted impact of the negative sentiment for food across those 100 ACME reviews was −0.3.

(2) There were 50 reviews that contained a positive sentiment for food, and the average adjusted impact of the positive sentiment for food across those 50 ACME reviews was +0.2.

(3) There were 0 reviews that contained a neutral sentiment for food, and the average adjusted impact of the neutral sentiment for food across those 0 ACME reviews was 0.

In this example, the overall impact of the food category on the overall sentiment for ACME is determined by aggregating or rolling up (e.g., by averaging) the individual impacts of each of the different sentiments for the food category, scaled by the number of reviews in which each of the different sentiments was found, and then by dividing by the total number of reviews.

For example, the overall impact of the food category on the overall sentiment for ACME is determined to be.

$$\frac{100 * -0.3 + 50 * 0.2 + 0 * 0}{1000} = -0.02$$

That is, in this example, the category of food is driving overall satisfaction for ACME down by 0.2 stars. Similar processing may be performed for other categories. Suppose, for example, that it is determined that doctor competence is driving overall satisfaction for ACME up by 0.05 points, while wait time is driving overall satisfaction for ACME down by 0.3 points. Thus, the platform has determined how much various categories are driving or impacting ACME's overall sentiment. In this example, of food, doctor competence, and wait time, it is determined that wait time, with its impact of −0.3, is having the largest impact in driving down overall satisfaction for ACME. However, it may also be determined that industry-wide, this is in line with the expected impact of wait time for any typical hospital.

In the above example, the expected per-entity (or group of entities) impacts of categories on sentiment were determined by normalizing an industry baseline. In other embodiments, if there is sufficient feedback data for the entity (e.g., to prevent overfitting), then rather than working from an industry baseline, machine learning is performed directly on the feedback data for the entity. For example, after solving the optimization problem industry-wide, the optimization problem can then also be solved for a subset of that data, such as for a specific region, a specific company, etc.

Now that the platform has determined how much various categories are driving or impacting ACME's overall sentiment, benchmarking against cohorts may also be performed to determine insights (e.g., to determine biggest opportunities for improving overall sentiment). For example, by performing such benchmarking, platform 102 can determine, for ACME, how much more positive or negative impact different categories are having for ACME versus another group of hospitals. For example, suppose that the 1000 ACME reviews that were evaluated were for ACME reviews in the past 30 days. This allows for a determination of ACME's strengths and weaknesses relative to a benchmark.

Suppose that the above analysis is also performed to determine how much various categories are driving or impacting overall sentiment for other cohorts such as the rest of ACME's reviews (outside of the last 30 days), the hospital BETA, and a best-in-class hospital. The impacts for these other cohorts is determined by performing the above analysis on the feedback specific to those cohorts. That is, in some embodiments, the benchmarks may be determined by performing the aforementioned renormalization of the industry-wide baseline, but using the feedback data specific to a given benchmark. The same or different cohorts over different time periods may also be used.

Suppose that the following results are determined by platform 102

TABLE 3

| Cohort | Impact of Food | Impact of Doctor Competence | Impact of Wait time |
|---|---|---|---|
| ACME in last 30 days | −0.02 | +0.05 | −0.3 |
| Rest of ACME | −0.1 | +0.1 | −0.4 |
| BETA | 0 | 0 | −0.7 |
| Best-in-class | 0 | 0 | −0.1 |

In this example, for each category, platform 102 performs a comparison of the impact between ACME in the last 30 days and the other benchmark cohorts. Suppose that the biggest weaknesses of ACME are to be determined. For each category, it is determined which benchmarks ACME in the last thirty days lags behind. For example, with respect to food, ACME in the last 30 days lags behind both the benchmarks Beta and Best-in-class. However, while ACME in the last 30 days is stronger in doctor competence compared to BETA and Best-in-class, ACME in the last 30 days lags behind the rest of ACME (+0.05 versus +0.1, meaning a net −0.05 drop in sentiment due to doctor competence). With respect to wait time, ACME has strengthened itself in the last thirty days, and is also stronger than BETA. However, it is weaker as compared to the best-in-class, where wait-time negatively impacts ACME (in the last 30 days) by 0.2 points more than it does for the best-in-class hospital.

Thus, based on the benchmarking analysis, platform 102 determines that for ACME (in the last 30 days), its biggest weaknesses compared to any benchmarks are doctor competence (−0.05) and wait time (−0.2) (versus Best Case). The gaps where ACME trails can be prioritized to rank the weaknesses by points impact (e.g., with wait time the larger weakness compared to doctor competence). However, while ACME lags behind benchmarks in these categories, they are also the largest opportunities for ACME to address in order to improve overall satisfaction. Based on the prioritization, platform 102 may present to Bob ACME that, out of all of the categories, its biggest opportunity is to try to improve wait time to where the best-in-class is. As the category of wait time has been identified, the platform may also allow Bob to further explore the differences between how reviewers are responding to wait time for ACME versus the best-in-class hospital (e.g., by surfacing reviews that are negative about wait time, for both ACME and the best-in-class hospital). In this example, while multiple benchmarks were compared against, single benchmarks may also be compared against. Additionally, certain benchmarks may be prioritized. For example, ACME may prioritize insights based on using the rest of ACME as a benchmark instead of Best in Class. This may be based on analysis that improving to the level of these benchmarks is more attainable. In some embodiments, determining attainability is performed by tracking how successful a customer of the platform was at improving to the level of a benchmark based on insights generated in a previous period.

While an example involving hospitals was described above, the techniques described above may be variously adapted to determine strengths and weaknesses for other industries. For example, for auto dealerships, similar analysis may be performed with different predefined categories specific to the auto dealership industry (e.g., service department, parts, sales, etc.).

In the above examples, reviews for ACME were evaluated to determine strengths and weaknesses. Other types of feedback may also be evaluated. For example, surveys may be evaluated instead of or in addition to reviews. As one example, the survey requests survey responders to provide an overall sentiment rating, as well as provide a comment. In one embodiment, the survey explicitly asks responders to provide a rating (e.g., from 1 to 5) for each category, as well as to provide a rating (also from 1 to 5) indicating their overall experience or overall CSAT (customer satisfaction) score. Machine learning techniques (such as the regression described above) may then be run directly on the survey data. With such survey data, the text analysis described above may need not be performed although could be used to augment the data. Further, sentiment for categories need not be determined (as it is indicated explicitly by the survey responder). Similar to as described above, a model may be generated for predicting an overall rating for a survey based on sentiment for various categories. This provides a way to determine the relative impact of different categories. The survey data may then be merged with review and other types of feedback data to determine, for example, an overall assessment in different categories and how they impact overall satisfaction for customers of the entity. It can also be determined, for different types of feedback items, how much people are talking about different categories. For example, sentiment about all the predefined categories may be more available from surveys (since responders are prompted or primed explicitly to provide feedback on the categories) versus reviews (since reviewers will decide what categories they wish to talk about). Further, for surveys, responders may not talk about categories that they are not asked to rate (e.g., a responder will not talk about billing or insurance because those topics were not on the survey). These differences may be attributed to the survey being a form of structured data, while reviews are unstructured. The techniques described herein allow for the evaluation of both structured and unstructured data, as well as allow for integrating such structured and unstructured data to determine the impacts of categories on overall sentiment.

Figure 4:
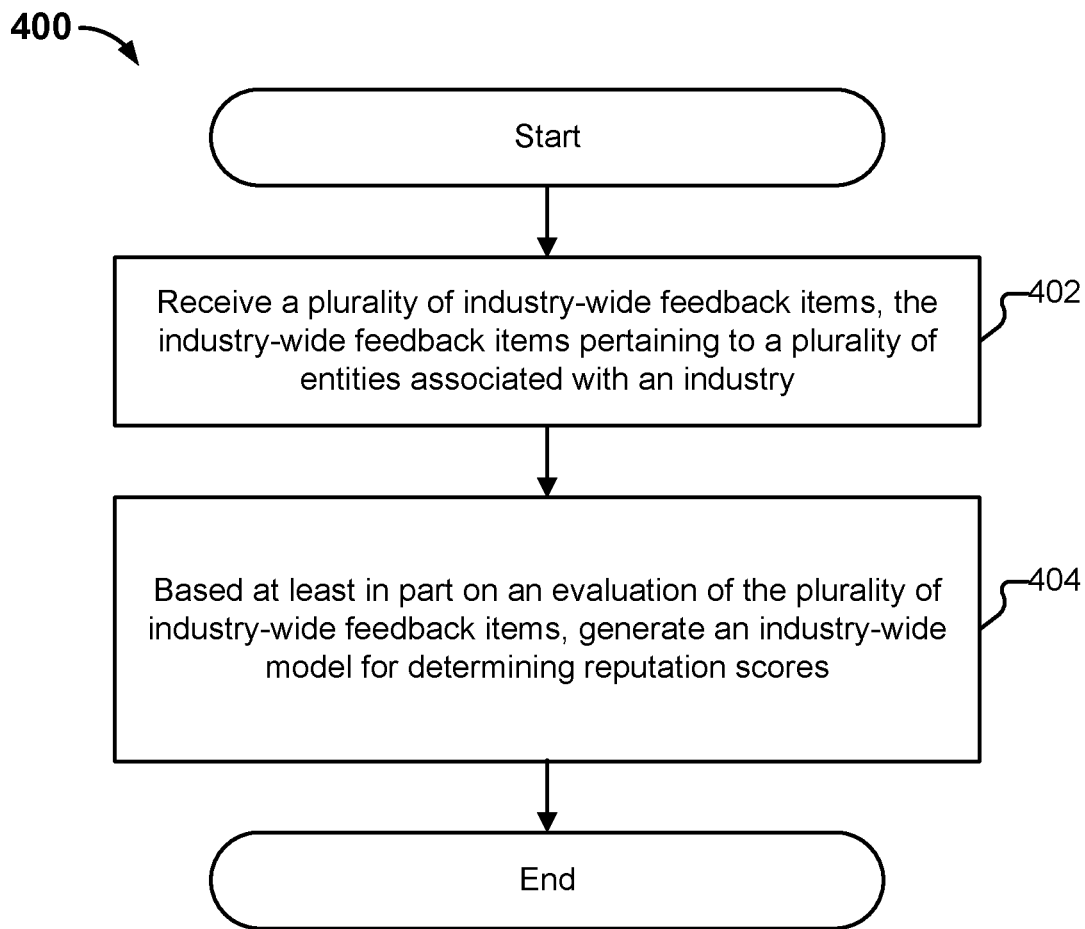
FIG. 4 is a flow diagram illustrating an embodiment of a process for impact-based reputation strength and weakness determination.

FIG. 4 is a flow diagram illustrating an embodiment of a process for impact-based reputation strength and weakness determination. In some embodiments, process 400 is executed by insights engine 224 of platform 102. The process begins at 402, when a plurality of industry-wide feedback items is received, the industry-wide feedback items pertaining to a plurality of entities associated with an industry.

At 404, based at least in part on an evaluation of the plurality of industry-wide feedback items, an industry-wide reputation scoring model is generated. The industry-wide model is usable to determine an expected reputation score for an average or typical entity in the industry as a function of a combination of reputation score components. Generating the industry-wide reputation scoring model includes determining an expected impact of a reputation score component on a reputation score of an average or typical entity. A baseline reputation score is also determined based at least in part on the generated industry-wide model. In one embodiment, the baseline reputation score is an expected starting reputation score. In some embodiments, the industry-wide reputation scoring model, the expected relative impact of a value of a reputation score component on a reputation score, and the baseline reputation score are determined at least in part by performing machine learning processing, such as a regression, decision tree, etc. (which is used to generate the industry-wide model).

In some embodiments, as described above, the expected baseline starting reputation score and the expected impacts of score components on reputation scoring for a typical entity in the industry are used to determine the impacts of values of score components on reputation scoring for a specific target entity (versus the average entity in the industry). For example, the feedback data pertaining to the specific target entity is obtained. For each piece of feedback data, an observed reputation score is determined (e.g., the overall rating accompanying a review) for the piece of feedback. A predicted reputation score based on the industry-wide model is generated based on the characteristics of the review (which are fed as values to the reputation scoring components to generate the predicted score). To determine the impact of values of scoring components on the reputation score for the specific target entity (versus an average entity in the industry), in some embodiments, as described above, the expected impacts of scoring component values on the average entity are normalized by a ratio of the gap or difference between the starting score and the observed reputation score, and the difference between the starting score and the predicted reputation score. In other embodiments, differences between the gap in starting score and observed reputation score, and the gap in starting score and expected/predicted reputation score are normalized by attributing the differences from the baseline starting score to an X-factor (e.g., brand sentiment factor) that is specific to the specific target entity.

As described above, various processing may be performed based on the output of the impact analysis described above. For example, benchmarking may be performed to identify which scoring components (which may relate to various reputation attributes and metrics such as topics, categories, volume, click-through rates, etc.) are strengths/weaknesses of a target set of entities relative to a benchmark set of entities, as described above. The strengths/weaknesses may also be prioritized, as described above (e.g., based on the differences in impact of the reputation component between the target and benchmark sets of entities). Further processing may be performed based on the identification of what scoring components are strengths/weaknesses, such as ticketing. This includes automatically generating rules used to flag or tag collected feedback items as pertaining to the identified strengths/weaknesses. Based on the tagging of those feedback items as pertaining to strengths/weaknesses, processing such as alerting, expediting (e.g., to surface such feedback items for immediate response by a user), etc. may be performed.

Further Details and Embodiments Regarding Score Calibration

One aspect of a reputation score that can make it quite compelling is when it tracks to key performance goals of an entity such as search rankings, online traffic, revenue, and retention metrics.

After having identified its weaknesses and improved its online reputation score, ACME would now like to see how changes in online reputation score can be used to drive other metrics, such as search rankings, sales, other key performance indicators (KPIs), etc. The following is an example illustrating score calibration to have reputation scoring track local Google search rankings for hospitals.

As described above, in some embodiments, a reputation score is computed as a combination of weighted factors (where the factors may be various measures, metrics, other reputation scores, etc.). In this example, performing calibration of a reputation score includes tuning the weights of the factors (or fitting some other form of predictive model, e.g. a decision tree) such that the reputation score tracks with a target metric.

In this example, platform 102 (e.g., using the scoring calibration engine), obtains search ranking data for the hospital industry (which will be used to define a metric against which a reputation score is to be calibrated). For example, platform 102 obtains various Google search results, such as Google local pack, Google maps, Google local guide, and Google search rankings for hospitals in a set of geographic regions (e.g., 100 US cities) to identify hospitals and where they rank (e.g., relative to each other). Search ranking data from other sources may also be obtained (e.g., Facebook search results in response to a query for "hospitals near me").

For each of the identified hospitals in the geographic region, reputation data on which the reputation score to be calibrated is based on is obtained, such as reviews, listings, social comments, whether the identified hospitals respond to reviews, the amount of engagement on social media of the identified hospitals, etc. The obtained reputation data is used to generate a model. Examples of reputation scores that may be calibrated include a review sentiment score (e.g., average rating of online reviews in the last 12 months, which may be weighted by every single review by recency and by source), review volume score, review diversity, review response score, social engagement score, listings score, coverage score, percentile rank amongst all US hospitals, etc., each of which may be calculated or defined in various ways. Various methods may be used to calculate each of these scores.

In this example, suppose that the reputation score to be calibrated is an overall composite reputation score, which is the weighted average of the above example reputation scores. Each of the component reputation scores that makes up the overall reputation score to be calibrated is normalized. For example, the component reputation scores for a hospital are normalized by their percentile across the component reputation score. In this example, each of the component reputation scores is normalized to a scale of zero to one.

The scoring calibration engine is configured to use the obtained search ranking data to calibrate the overall reputation score by selecting the weights or more generally the required parameters for each of the component reputation scores.

In this example, the calibration includes solving an optimization problem. In this example, an optimization problem is solved to determine the optimized weights for the reputation score such that it tracks as closely as possible to a desired key metric. For example, the scoring calibration engine performs a pairwise comparison of every two hospitals in any US city. For a pair of hospitals, the score calibration engine uses the search ranking data to determine which hospital in the pair shows up higher in search rankings, and which hospital in the pair has the higher overall reputation score, according to any given set of weights. The optimization problem that is solved by the scoring calibration engine in this example is to minimize the number of pairs where a hospital with lower overall reputation score outranks, in search rankings, the hospital with the higher overall reputation score. That is, the objective function being solved is pairwise in this case, where the objective function is, for any two hospitals in the same city when searching for hospitals in the city, which hospital shows up first (or is otherwise ranked higher or prioritized)?

The following is an example of pseudocode for solving the pairwise objective function:

$\forall_{i,j}$ in the same city $$R_{i,j} = \frac{1 \text{ if } i \text{ outranks } j}{0 \text{ else}}$$

That is, for each pair of dealers i and j, $R_{i,j}=1$ if hospital i outranks dealer j (according to the obtained search ranking data), and equals 0, otherwise. Then, suppose that the hospitals i and j have the respective overall reputation scores (which is what is being calibrated) of:

$S_i$ and $S_j$

Based on the scores $S_i$ and $S_j$, calculate:

$$\hat{R}_{i,j} = \frac{1 \text{ if } S_i > S_j}{0 \text{ else}}$$

The objective function then is to minimize the sum across all i,j of $\hat{R}_{i,j} - R_{i,j}$. That is, for example:

$\min \Sigma_{i,j}(\hat{R}_{i,j} - R_{i,j})^2$

The scoring calibration engine adjusts or selects weights of the reputation scoring components to minimize the above function.

In some embodiments, the optimization problem (which as one example is an inner-outer loop expectation maximization problem) is solved iteratively. For example, the weights were solved for component reputation scores such as review volume. Review volume may in turn be made up of five other sub-components, each with its own weight. Those weights or parameters can also be solved for.

In the above, pairwise optimization was performed for calibration to search rankings. As another example, a search metric could be created that indicates the percentage of time that a hospital appears in a search in the top three hospitals. The metric may be weighted (e.g., providing more bonus points for being at the top). Machine learning (e.g., regression analysis) may be performed using the search metric to select the weights/coefficients to fit the reputation scoring to the created search metric against which reputation scoring is calibrated.

In various embodiments, the type of score calibration processing that is performed is dependent on the type of metric against which a reputation score is to be calibrated. For example, pairwise comparison is performed above, as search rankings are metrics that are determined relative to at least one other entity that might show up in the search ranking. However, a different type of score calibration processing may be performed for other types of metrics, such as sales, conversion rate for listings (or other actions over views of listings), etc. that are more absolute.

For example, consider AutoBest, which is in another type of industry, auto dealerships. While for an auto dealership we may also use the pairwise processing described above to perform reputation scoring calibration with respect to search rankings of dealerships, suppose that we would also like to ensure that their overall reputation score tracks with car sales. By optimizing the weights for the component reputation scores, we can calibrate reputation score and ensure it is calibrated to predict either search ranks and/or car sales. The following is an example illustrating calibration of overall reputation scoring to map to sales for a dealership, AutoBest.

Suppose there are observed 9,000 US auto dealerships. In this example, the scoring calibration engine obtains, for those 9,000 US auto dealerships, the number of cars they sold last year. In one embodiment, machine learning (e.g., regression analysis) is performed to fit weights of the reputation score versus car sales. For example, when performing a regression, the coefficients of the components of the overall reputation score being calibrated are solved to calculate expected sales for every location (dealership) as a function of each of the components of the reputation score.

The scoring calibration described above may be re-run over time, for example, to update the calibration using new target metric data (where the update may be updated in a prior and/or posterior manner).

By performing the mapping/relationship determination of the scoring calibration, platform 102 is able to provide various insights to AutoBest, such as that improving their overall reputation score by 30 points translates to an expected 1% increase in sales for an auto dealership on average. These relationships may also be established by observing how scores and sales (or other performance metrics) relate in a period subsequent to the period the model was calibrated on (or any other training/test type setup, as appropriate).

Benchmarking may also be performed based on the scoring calibration to provide other insights. For example, with respect to the calibration of reputation scoring to search ranking, with a calibrated scoring model (with the optimized weights), insights may be provided that indicate how much certain components of the overall reputation score drive ACME's score up or down versus their competitors, as well as how that impacts search (e.g., estimating an improvement by 20% in search rankings if improving this score component by X amount).

As another example, suppose that after performing score calibration, the weight for the review sentiment component of the overall reputation score is 0.4, and that the weight for the review volume component of the overall reputation score is 0.5

In this example, suppose that ACME's sentiment score is 40, and ACME's review volume score is 50. Suppose that a benchmark has a sentiment score of 45 and a volume score of 70. Based on the weighting, the impact of the difference of 5 points in sentiment score on reputation score is 2% (determined by multiplying the sentiment score of 5 by the selected weight of 0.4). If the score is on a scale of 1000 points, then this translates to a difference in 20 points. Performing similar analysis on the benchmarking with respect to volume score, the impact of the difference in volume score of 20 compared to the benchmark is 4%, which translates to 40 points on the one thousand point scale. Actions may then be suggested by prioritizing based on impacts. Further, after identifying a score component to be analyzed, the component can be broken down for further analysis. For example, volume can be broken up into its constituent components, such as volume by different sources. Sentiment may be broken down into categories (e.g., impact of wait times). The change in score may then be used to determine an expected impact on a metric, such as sales per year. For example, it can be determined that improving wait time will help ACME to make up the 5 point gap in sentiment score with the benchmark, which will drive up ACME's overall reputation score by 20 points, which equals, in this example, ⅔ of 1 percent, or approximately 0.67%, which in turn has an expected impact on sales per year that may be determined based on the calibration. That is, because the calibration has been performed to select weights to generate a function of the components of the reputation score that maps as closely as possible to sales volume, the generated function maps to the metric of sales volume, where the reputation score thus maps to expected sales. For example, the expected number of sales has been determined as a function of components of the overall reputation score (e.g., there is a relationship of 1% more car sales for an increase of 30 points, or the expected number of sales is equal to seven times the calibrated reputation score).

Thus, using the score calibration, platform 102 can provide various recommendations and suggestions for improving aspects of reputation scoring (e.g., improving volume of reviews, improving sentiment across reviews and other sources), where improvement in the identified areas relate to improvement in performance indicators such as increased traffic, higher search rankings, increase conversions, more sales, other target outcomes, etc. (because, for example, the reputation scoring is much more explicitly dependent on the performance indicator by performing the scoring calibration).

Figure 5:
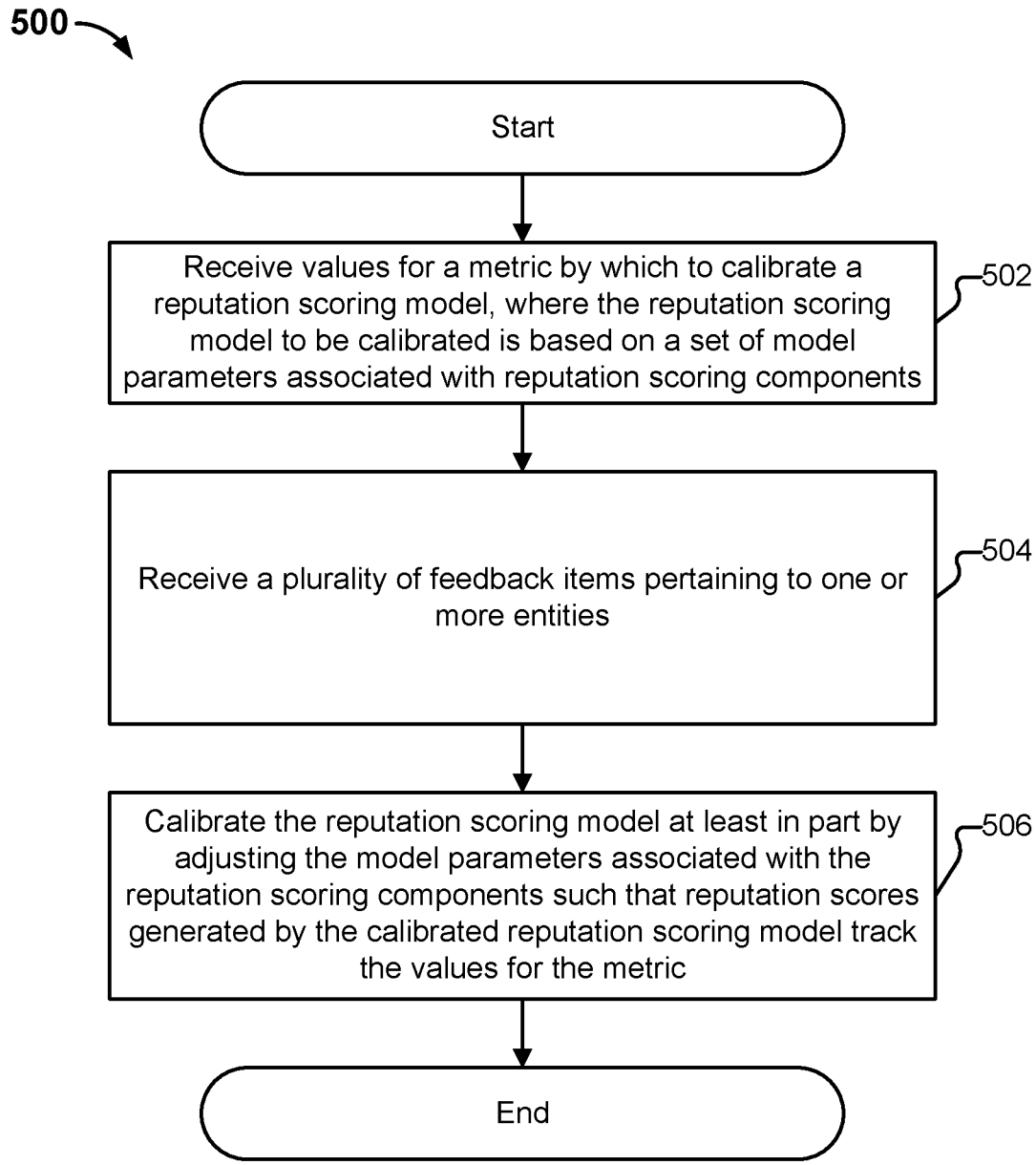
FIG. 5 is a flow diagram illustrating an embodiment of a process for reputation scoring calibration.

FIG. 5 is a flow diagram illustrating an embodiment of a process for reputation scoring calibration. In some embodiments, process 500 is executed by calibration engine 222 of platform 102. The process begins at 502, when values for a metric by which to calibrate a reputation scoring model are received. In some embodiments, the reputation scoring model to be calibrated is based on various model parameters associated with reputation scoring components. The reputation scoring model is usable to determine a reputation score. In some embodiments, a reputation scoring component is associated with a set of characteristics of reputation feedback data. At 504, a plurality of feedback items pertaining to one or more entities is received. At 506, the reputation scoring model is calibrated by adjusting at least some of the model parameters associated with the reputation scoring components such that reputation scores generated by the calibrated reputation scoring model track the values for the metric. In one embodiment, the reputation scoring model is a weighted reputation scoring components, where the weights are an example of parameters which are adjusted when performing calibration. The manner in which the adjustment of the model parameters is performed may vary depending on the type of metric against which the reputation scoring is being calibrated. For example, if the metric is an absolute value by which an entity is measured, then a machine learning technique such as regression analysis may be performed to determine the weights for the reputation scoring function/model. On the other hand, if the metric is one that is measured relative to other entities (e.g., a ranking metric), then machine-learning techniques that solve pairwise objective functions, such as pairwise regression, may be performed. Based on the calibration, the calibrated reputation scoring may be used to predict, for example, given a change in reputation scoring, an expected change in the value of the metric against which the reputation scoring was calibrated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  receive a plurality of historical feedback items;
  determine that a first feedback item in the plurality of historical feedback items preceded an occurrence of a type of reputation event comprising a drop in reputation score of at least a threshold amount;
  partition the historical feedback items according to a time at which the drop in reputation score occurred, wherein partitioning the historical feedback items comprises:
   bucketing the first feedback item in the plurality of historical feedback items into a first partition of feedback items that are determined to have preceded occurrences of the type of reputation event;
   determining that a second feedback item in the plurality of historical feedback items did not precede an occurrence of the type of reputation event; and
   bucketing the second feedback item in the plurality of historical feedback items into a second partition of feedback items, the second partition comprising a baseline partition of feedback items that did not precede occurrences of the type of reputation event;
  based at least in part on the partitioning of the historical feedback items into the first partition and the second partition according to the time at which the drop in reputation score occurred:
   evaluate words present in feedback items in the first partition of feedback items; and
   determine combinations of words present in the first partition of feedback items, wherein a combination of words comprises a candidate pattern present in the first partition of feedback items;
  determine a first frequency of appearance of the combination of words in the first partition of feedback items;

determine a second frequency of appearance of the combination of words in the second partition of feedback items;

determine that the combination of words is disproportionately present in the first partition of feedback items as compared to the second partition of feedback items at least in part by determining that a ratio of the first frequency to the second frequency exceeds a threshold;

in response to determining that the combination of words is disproportionately present in the first partition of feedback items preceding occurrences of the type of reputation event, as compared to the second partition of feedback items that did not precede occurrences of the type of reputation event, designate the combination of words as a signal for drops in reputation score;

based at least on part on an evaluation of words in one or more subsequently ingested feedback items, detect a presence of the signal in the one or more subsequently ingested feedback items; and in response to detecting the presence of the signal in the one or more subsequently ingested feedback items, surface the one or more subsequently ingested feedback items in which the presence of the signal was detected at least in part by generating an alert; and a memory coupled to the processor and configured to provide the processor with instructions.

2. The system recited in claim 1 wherein the first feedback item is bucketed into the first partition based at least in part on a determination of a difference between a reputation score for a previous period prior to the first feedback item, and a reputation score for a subsequent period subsequent to the first feedback item.

3. The system recited in claim 1 wherein the processor is further configured to predict an impact that appearance of the signal has on reputation scoring.

4. The system recited in claim 1 wherein the combination of words is not associated with previously defined categories, and wherein the processor is further configured to determine one or more new categories based at least in part on the combination of words.

5. The system recited in claim 1, wherein the plurality of historical feedback items comprises one or more reviews, surveys, listings, social comments, and search results.

6. The system recited in claim 1 wherein the first feedback item is bucketed into the first partition based at least in part on a determination that the first feedback item preceded the occurrence of the type of reputation event within a window of time.

7. The system recited in claim 1, wherein the processor is further configured to bootstrap generating of a predictive model at least in part by using the signal as training data.

8. A method, comprising:

receiving a plurality of historical feedback items;

determining that a first feedback item in the plurality of historical feedback items preceded an occurrence of a type of reputation event comprising a drop in reputation score of at least a threshold amount;

partitioning the historical feedback items according to a time at which the drop in reputation score occurred, wherein partitioning the historical feedback items comprises:

bucketing the first feedback item in the plurality of historical feedback items into a first partition of feedback items that are determined to have preceded occurrences of the type of reputation event;

determining that a second feedback item in the plurality of historical feedback items did not precede an occurrence of the type of reputation event; and bucketing the second feedback item in the plurality of historical feedback items into a second partition of feedback items, the second partition comprising a baseline partition of feedback items that did not precede occurrences of the type of reputation event;

based at least in part on the partitioning of the historical feedback items into the first partition and the second partition according to the time at which the drop in reputation score occurred:

evaluating words present in feedback items in the first partition of feedback items; and determining combinations of words present in the first partition of feedback items, wherein a combination of words comprises a candidate pattern present in the first partition of feedback items;

determining a first frequency of appearance of the combination of words in the first partition of feedback items;

determining a second frequency of appearance of the combination of words in the second partition of feedback items;

determining that the combination of words is disproportionately present in the first partition of feedback items as compared to the second partition of feedback items at least in part by determining that a ratio of the first frequency to the second frequency exceeds a threshold;

in response to determining that the combination of words is disproportionately present in the first partition of feedback items preceding occurrences of the type of reputation event, as compared to the second partition of feedback items that did not precede occurrences of the type of reputation event, designating the combination of words as a signal for drops in reputation score;

based at least on part on an evaluation of words in one or more subsequently ingested feedback items, detecting a presence of the signal in the one or more subsequently ingested feedback items; and in response to detecting the presence of the signal in the one or more subsequently ingested feedback items, surfacing the one or more subsequently ingested feedback items in which the presence of the signal was detected at least in part by generating an alert.

9. A computer program product embodied in a non-transitory computer readable storage medium and comprising computer instructions for:

receiving a plurality of historical feedback items;

determining that a first feedback item in the plurality of historical feedback items preceded an occurrence of a type of reputation event comprising a drop in reputation score of at least a threshold amount;

partitioning the historical feedback items according to a time at which the drop in reputation score occurred, wherein partitioning the historical feedback items comprises:

bucketing the first feedback item in the plurality of historical feedback items into a first partition of feedback items that are determined to have preceded occurrences of the type of reputation event;

determining that a second feedback item in the plurality of historical feedback items did not precede an occurrence of the type of reputation event; and bucketing the second feedback item in the plurality of historical feedback items into a second partition of feedback items, the second partition comprising a baseline partition of feedback items that did not precede occurrences of the type of reputation event;

based at least in part on the partitioning of the historical feedback items into the first partition and the second partition according to the time at which the drop in reputation score occurred:

evaluating words present in feedback items in the first partition of feedback items; and determining combinations of words present in the first partition of feedback items, wherein a combination of words comprises a candidate pattern present in the first partition of feedback items;

determining a first frequency of appearance of the combination of words in the first partition of feedback items;

determining a second frequency of appearance of the combination of words in the second partition of feedback items;

determining that the combination of words is disproportionately present in the first partition of feedback items as compared to the second partition of feedback items at least in part by determining that a ratio of the first frequency to the second frequency exceeds a threshold;

in response to determining that the combination of words is disproportionately present in the first partition of feedback items preceding occurrences of the type of reputation event, as compared to the second partition of feedback items that did not precede occurrences of the type of reputation event, designating the combination of words as a signal for drops in reputation score; and based at least on part on an evaluation of words in one or more subsequently ingested feedback items, detecting a presence of the signal in the one or more subsequently ingested feedback items; and in response to detecting the presence of the signal in the one or more subsequently ingested feedback items, surfacing the one or more subsequently ingested feedback items in which the presence of the signal was detected at least in part by generating an alert.

* * * * *